US011363653B2

(12) United States Patent
Uddin et al.

(10) Patent No.: US 11,363,653 B2
(45) Date of Patent: Jun. 14, 2022

(54) AD HOC SERVICE SWITCH-BASED CONTROL OF AD HOC NETWORKING

(71) Applicant: Nokia of America Corporation, Murray Hill, NJ (US)

(72) Inventors: Mostafa Uddin, Holmdel, NJ (US); Sarit Mukherjee, Morganville, NJ (US); T. V. Lakshman, Morganville, NJ (US); Hyunseok Chang, Holmdel, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 60 days.

(21) Appl. No.: 16/498,452

(22) PCT Filed: Apr. 7, 2017

(86) PCT No.: PCT/US2017/026494
§ 371 (c)(1),
(2) Date: Sep. 27, 2019

(87) PCT Pub. No.: WO2018/186873
PCT Pub. Date: Oct. 11, 2018

(65) Prior Publication Data
US 2021/0092786 A1 Mar. 25, 2021

(51) Int. Cl.
*H04W 76/15* (2018.01)
*H04L 69/22* (2022.01)
(Continued)

(52) U.S. Cl.
CPC .............. *H04W 76/15* (2018.02); *H04L 69/22* (2013.01); *G16Y 10/75* (2020.01); *H04W 4/80* (2018.02); *H04W 84/18* (2013.01)

(58) Field of Classification Search
CPC .............................. H04W 76/15; H04L 69/22
See application file for complete search history.

(56) References Cited

U.S. PATENT DOCUMENTS

2005/0041628 A1   2/2005   Duggi et al.
2005/0286419 A1*  12/2005  Joshi ..................... H04L 45/123
                                                                370/230
(Continued)

FOREIGN PATENT DOCUMENTS

EP           2899930 A1    7/2015

OTHER PUBLICATIONS

International Search Report and Written Opinion received for corresponding Patent Cooperation Treaty Application No. PCT/US2017/026494, dated Dec. 14, 2017, 9 pages.
(Continued)

*Primary Examiner* — Kevin M Cunningham
(74) *Attorney, Agent, or Firm* — Duft & Bornsen, PC

(57) ABSTRACT

An apparatus may implement an ad hoc service switch to establish an ad hoc link between ad hoc devices, such that the apparatus is a transparent node in an ad hoc link between the ad hoc devices. The apparatus may implement rule-based control of at least one ad hoc device, based on processing a data packet received from an ad hoc device via the ad hoc link. Rule-based control may include performing at least one operation of selectively forwarding the data packet, selectively inhibiting the data packet from being forwarded, modifying the data packet, and generating and transmitting a new data packet. The apparatus may establish the ad hoc link via an initial ad hoc link between the apparatus and the first device, a network communication link between the apparatus and an external apparatus, and an ad hoc link between the external apparatus and the second device.

20 Claims, 11 Drawing Sheets

(51) Int. Cl.
　　　*H04W 4/80*　　　(2018.01)
　　　*G16Y 10/75*　　　(2020.01)
　　　*H04W 84/18*　　　(2009.01)

(56) References Cited

U.S. PATENT DOCUMENTS

| | | | |
|---|---|---|---|
| 2007/0165592 A1 | 7/2007 | Gossain et al. | |
| 2009/0310617 A1* | 12/2009 | Harris | H04W 88/04 370/401 |
| 2011/0021142 A1* | 1/2011 | Desai | H04W 8/005 455/41.2 |
| 2011/0092164 A1* | 4/2011 | Spanhake | H04W 40/10 455/67.11 |
| 2013/0212439 A1* | 8/2013 | Stevens | H04L 43/0894 714/39 |
| 2014/0025806 A1* | 1/2014 | Robitaille | H04L 63/0414 709/224 |
| 2015/0124625 A1* | 5/2015 | Aldrin | H04L 45/10 370/238 |
| 2016/0088424 A1* | 3/2016 | Polo | H04W 4/80 455/41.1 |
| 2016/0380778 A1* | 12/2016 | Shen | H04L 45/04 709/209 |
| 2017/0317713 A1* | 11/2017 | Tsai | H04B 17/318 |
| 2020/0251107 A1* | 8/2020 | Wang | G10L 15/02 |

OTHER PUBLICATIONS

Office Action received for corresponding European Patent Application No. 17719974.2, dated Jan. 13, 2021, 6 pages.

* cited by examiner

| ATT HEADER | `fields ATT_header { ATT_opcode :8; }` |
| --- | --- |
| READ REQUEST/RESPONSE | `fields ATT_rrq {`<br>`  handle :16;}`<br>`fields ATT_rrp {`<br>`  att_value :*;}` |
| READ-BY-TYPE REQUEST/RESPONSE | `fields ATT_rbtrq {`<br>`  start_handle :16;`<br>`  end_handle :16;`<br>`  att_type :16;}`<br>`fields ATT_rbtrp {`<br>`  entry_length :8;`<br>`  att_data_list :*;}` |
| WRITE REQUEST/RESPONSE | `fields ATT_wrq{`<br>`  handle :16;`<br>`  att_value :*;}`<br>`fields ATT_wrp{`<br>`  /*no fields */}` |
| NOTIFICATION | `fields ATT_notify {`<br>`  handle :16;`<br>`  att_value :*;}` |
| METADATA | `field ATT_metadata{`<br>`  length :8;`<br>`  SID :48;`<br>`  DID :48;`<br>`  in_port :16;`<br>`  enable :8; /*initial value 1*/`<br>`  index :16; /*initial value 0*/`<br>`  handle :16; /*initial value 0*/}` |

*FIG. 5*

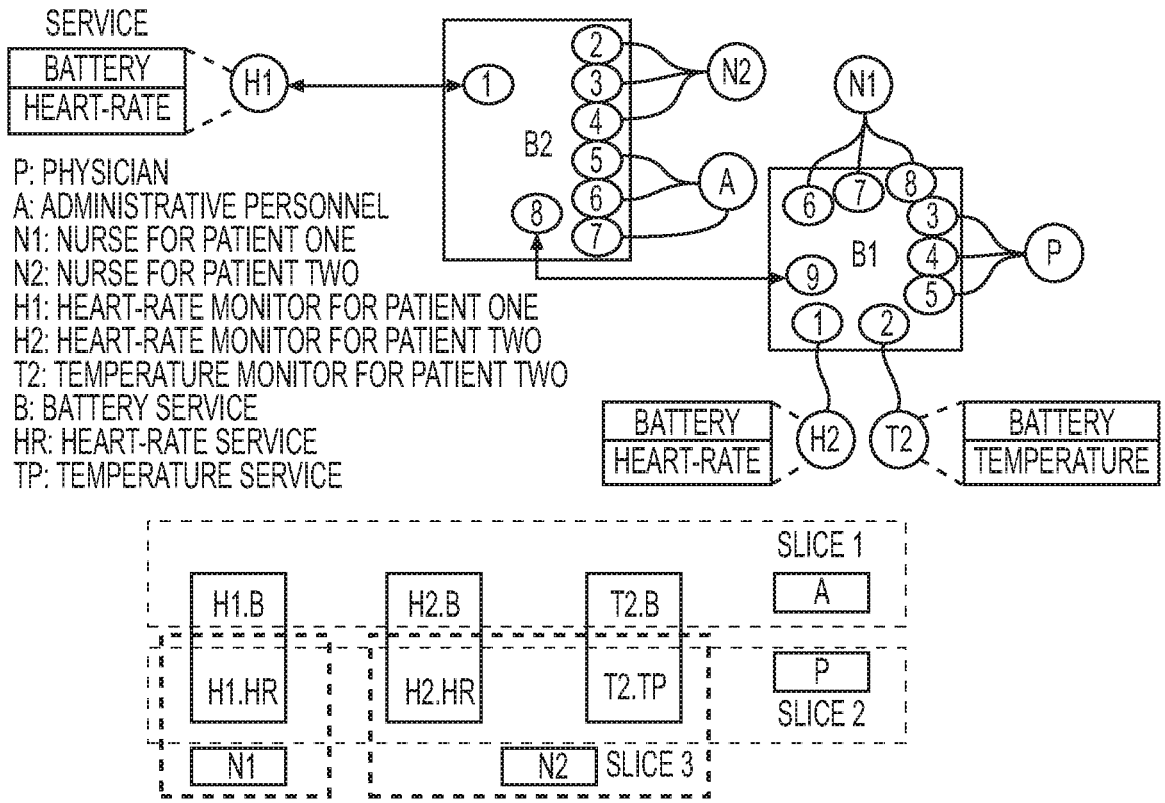

FIG. 6A

```
Rule1:table=0,SID=A,DID=H2,in_port=6,att_attOpcode=READ_REQUEST,
    att_rrq_handle=BATTERY,actions=output:8
Rule2:table=0,SID=A,DID=H2,in_port=6,att_attOpcode=READ_REQUEST,
    att_rrq_handle=HEART_RATE,
    actions=remove_header:att_rrq, add_header=att_err,
    resubmit(,1)
Rule3:table=1,SID=A,DID=H2,in_port=6,att_attOpcode=READ_REQUEST,
    att_rrq_handle=HEART_RATE
    actions=set_field:0x05->att__attLength,
    set_field:ERROR_RESPONSE->att__attOpcode,
    set_field:READ_REQUEST->att_err_att_request_opcode,
    set_field:HEART_RATE->att_err_att_handle_error,
    set_field:READ_ERROR_CODE->att_err_att_error_code,
    Output:6
Rule4: table=0,SID=H1,DID=A,in_port=1,
    att_attOpcode=READ_REPLY, actions=output:6
```

FIG. 6B

```
Rule1:table=0,in_port=1,att_att0pcode=NOTIFY,
    att_notify_handle=BPM
    actions=comparison(att_notify_value,111,1,2)
Rule2:table=1,in_port=1,att_att0pcode=NOTIFY,
    att_notify_handle=BPM actions=output:2,3
Rule3:table=2,in_port=1,att_att0pcode=NOTIFY,
    att_notify_handle=BPM actions=output:2
```

```
Rule1:table=0,in_port=1,att_attOpcode=WRITE_REQ,
     att_wrq_handle=AC_STATUS, att_wrq_att_value=ON
     actions=output:2,goto_table:1
Rule3:table=0,in_port=2 actions=output:1
Rule4:table=0,in_port=3 actions=
Rule2:table=1,in_port=1,
     actions=set_field:POWER_SOCKET_STATUS->att_wrq_handle,
     set_field:OFF->att_wrq_att_value, output:3
```

| WITH BLESS | | | | WITHOUT BLESS | | |
|---|---|---|---|---|---|---|
| CI (ms) | | ROUND-TRIP DELAY (ms) | | CI (ms) | ROUND-TRIP DELAY (ms) | |
| C↔B | B↔P | READ | READ BY TYPE | C↔P | READ | |
| 10 | 10 | 15.1 | 16.88 | 10 | 12.3 | |
| 30 | 10 | 30.12 | 31.08 | 30 | 30.6 | |
| 50 | 10 | 50.1 | 50.6 | 50 | 50.08 | |
| 100 | 10 | 101.3 | 102.5 | 100 | 101.1 | |
| 100 | 20 | 101.35 | 102.9 | 100 | 101.1 | |
| 100 | 30 | 101.79 | 102.8 | 100 | 101.1 | |
| 100 | 50 | 102.85 | 103.9 | 100 | 101.1 | |

*FIG. 9*

AD HOC SERVICE SWITCH-BASED CONTROL OF AD HOC NETWORKING

RELATED APPLICATION

This application was originally filed as Patent Cooperation Treaty Application No. PCT/US2017/026494 filed Apr. 7, 2017.

BACKGROUND

With the rapid growth in the Internet of Things (IoT), ad hoc wireless network communication devices are finding widespread applications in medical and health care services, home automation, factory automation, sensing and control, consumer electronics, some combination thereof, or the like.

As referred to herein, ad hoc wireless network communication devices, also referred to herein as simply "ad hoc devices," may include devices configured to communicate via Bluetooth Low Energy (BLE). Such devices may be referred to herein as BLE devices. Bluetooth Low Energy (BLE) is a personal area wireless network technology that is of increasing importance for emerging Internet of Things (IoT) deployments. By design, BLE supports short-range, single-hop communication between a pair of BLE devices.

BLE enjoys popularity based on being associated with a low power physical and data link layer suited to low cost devices with long operating life on battery, and a transaction oriented service layer, comprising Attribute Protocol (ATT) and Generic Attribute Profile (GATT), that may facilitate fast development of different services on the devices.

With the envisaged growth in feature-rich devices incorporating useful service profiles, the potential for creating a variety of ad hoc networked services, including BLE networked services, comprising large numbers of interconnected ad hoc devices is expanding. These networked services will require establishing transactional relationships amongst large numbers of ad hoc devices and managing them to permit service-enhancing operations such as selective set-up or tear-down of transactions, filtering on ad hoc packet fields, in-network packet generation etc.

While each individual device can be configured and reconfigured to comply with the necessary dynamic relationships, it quickly becomes unmanageable as devices get reassigned, new devices get introduced, new services are created, etc. This is a major drawback in using some ad hoc communication schemes, including basic BLE, that needs to be addressed for large-scale ad hoc-based IoT service deployment, including large-scale BLE-based IoT service deployment.

Existing schemes for IoT service creation and management rely solely on cloud-based solutions where all IoT transactions are sent to a cloud-hosted application which decides on any needed follow-up action. A cloud-only solution is not best-suited for IoT-based applications due to its inadequate support for privacy and security, scalability, latency and bandwidth guarantees, etc. While a cloud-based approach may work for "ambient data collection and analytics" applications, "real-time applications with low-latency" work better by giving users some control over where applications execute. In addition, cloud-based approaches either require IP protocol stack in an IoT device, or need to connect the device to the cloud through a gateway. The former approach is riot well-suited for devices with small foot-prints. The latter approach requires development of special application level or operating system support (e.g., programming model or virtualization of ad hoc device). Neither of this is satisfactory.

SUMMARY

At least some example embodiments provide a form of rule-controlled ad hoc networking that may be used to enable service automation. with regard to various ad hoc devices connected via ad hoc wireless network communication links. Such networking may be enabled by an apparatus configured to implement an Ad Hoc Service Switch (AHSS) that may establish an ad hoc wireless network communication link ("ad hoc link") between two ad hoc devices via the apparatus, such that the apparatus is a transparent node in the ad hoc link. Such an apparatus may be referred to herein interchangeably as an "AHSS apparatus," "AHSS device," and "AHSS node."

The AHSS apparatus may, in sonic example embodiments, control one or more ad hoc devices based on controlling the transmission of ad hoc data packets (also referred to herein as simply "packets") to one or more of the devices. The AHSS apparatus may selectively forward packets between the ad hoc devices based on processing the packets when received at the AHSS apparatus. The AHSS apparatus may generate new packets for transmission to one of the devices based on one or more packets received at the apparatus.

One or more of such AHSS apparatuses may enable wide area IoT deployments using ad hoc devices (e.g., BLE devices) at the edge. The AHSS apparatus may implement a programmable AHSS (e.g., BLE service switch, or "BLESS") that is transparently inserted between two communicating ad hoc devices. The AHSS may be programmed at the service layer by a central controller to enable flexible, policy-based switching, as well as various in-network operations in ad hoc service switch networks. As a result, ad hoc links may be established between separate ad hoc devices that are, in the absence of the AHSS apparatus, located beyond the ad hoc communication range of each other.

Multiple AHSS apparatuses may be communicatively coupled (also referred to herein interchangeably as being "linked," "connected," or the like) via one or more communication networks separate from an ad hoc network to establish backhaul connectivity (e.g., IP backhaul connectivity) therebetween. The multiple AHSS apparatuses may be configured to collectively establish an ad hoc link between ad hoc devices connected to separate, respective AHSS apparatuses via separate, respective ad hoc links, where the ad hoc link is at least partially established based on tunneling (e.g., IP tunneling) enabled via the backhaul connectivity between the multiple AHSS apparatuses. As a result, ad hoc links may be established between separate ad hoc devices that are, in the absence of the AHSS apparatuses, located beyond the ad hoc communication range of each other.

In some example embodiments, an apparatus may include an ad hoc wireless network communication transceiver configured to establish ad hoc wireless network communication links with a plurality of devices, a memory storing a program of instructions, and a processor. The processor may be configured to execute the program of instructions to establish a first ad hoc wireless network communication link between a first device and a second device, such that the apparatus is a transparent node in the first ad hoc wireless network communication link between the first device and the second device, and implement rule-based control of at least one device, of the first device and the second device based on processing a first data packet received from the first device via the first ad hoc wireless network communication link. The rule-based control may include performing at least one operation of selectively forwarding the first data packet to the second device, selectively inhibiting the first data packet from being forwarded to the second device, modifying the first data packet and forwarding the modified first data packet to the second device, and generating and transmitting a second data packet to the second device.

Implementing rule-based control of at least one device includes selectively enabling access, by the first device over the first ad hoc wireless network communication link, to a particular service profile of the second device based on a determined identity associated with at least one device of the first device and the second device.

The determined identity may be a particular service profile associated with the at least one device.

The first data packet may include a request for a selected set of data from the second device. The implementing rule-based control of at least one device includes selectively forwarding the first data packet to the second device based on determining whether the first device is associated with an authorization to receive the selected set of data.

The first data packet may include an instance of data. The implementing rule-based control of at least one device may include selectively forwarding the first data packet to the second device based on processing the instance of data.

The instance of data may be associated with a particular data type and has a particular data value. The implementing rule-based control of at least one device may include selectively forwarding the first data packet to the second device based on determining whether the particular data value at least meets a threshold data value of the particular data type that is associated with the second device.

The processor may be further configured to execute the program of instructions to establish a second ad hoc wireless network communication link between the first device and a third device, such that the apparatus is a transparent node in the second ad hoc wireless network communication link. The processor may be further configured to execute the program of instructions to implement rule-based control of the third device based on generating, at the apparatus, a data packet that is transmitted to the third device based on processing a data packet communicated from the first device to the second device via the first ad hoc wireless network communication link.

The apparatus may further include a network communication interface configured to establish a network communication link with an external apparatus, the external apparatus further configured to establish ad hoc wireless network communication links with a separate plurality of devices. Establishing the first ad hoc wireless network communication link between the first device and the second device may include establishing, at the apparatus, an initial ad hoc wireless network communication link with the first device, communicating with the external apparatus, via the network communication link, to cause the external apparatus to establish a subsequent ad hoc wireless network communication link with the second device, and establishing the first ad hoc wireless network communication link via the initial ad hoc wireless network communication link, the network communication link, and the subsequent ad hoc wireless network communication link, such that the apparatus and the external apparatus are both transparent nodes in the first ad hoc wireless network communication link.

The processor may be further configured to execute the program of instructions to implement the rule-based control of the at least one device based on processing a plurality of data packets received at the apparatus, at least one data packet of the plurality of data packets received from the first device via the first ad hoc wireless network communication link.

According to some example embodiments, a method, implemented at an apparatus configured to establish ad hoc wireless network communication links with a plurality of devices, may include establishing a first ad hoc wireless network communication link between a first device and a second device, such that the apparatus is a transparent node in the first ad hoc wireless network communication link between the first device and the second device. The method may include implementing rule-based control of at least one device, of the first device and the second device based on processing a first data packet received from the first device via the first ad hoc wireless network communication link, such that the rule-based control includes performing at least one operation of selectively forwarding the first data packet to the second device, selectively inhibiting the first data packet from being forwarded to the second device, modifying the first data packet and forwarding the modified first data packet to the second device, and generating and transmitting a second data packet to the second device.

The implementing rule-based control of at least one device may include selectively enabling access, by the first device over the first ad hoc wireless network communication link, to a particular service profile of the second device based on a determined identity associated with at least one device of the first device and the second device.

The determined identity may be a particular service profile associated with the at least one device.

The first data packet may include a request for a selected set of data from the second device, and the implementing rule-based control of at least one device may include selectively forwarding the first data packet to the second device based on determining whether the first device is associated with an authorization to receive the selected set of data.

The first data packet may include an instance of data, and the implementing rule-based control of at least one device may include selectively forwarding the first data packet to the second device based on processing the instance of data.

The instance of data may be associated with a particular data type and has a particular data value, and the implementing rule-based control of at least one device may include selectively forwarding the first data packet to the second device based on determining whether the particular data value at least meets a threshold data value of the particular data type that is associated with the second device.

The method may further include establishing a second ad hoc wireless network communication link between the first device and a third device, such that the apparatus is a transparent node in the second ad hoc wireless network communication link between the first device and the third device, and implementing rule-based control of the third device based on generating, at the apparatus, a data packet that is transmitted to the third device based on processing a data packet communicated from the first device to the second device via the first ad hoc wireless network communication link.

Establishing the first ad hoc wireless network communication link between the first device and the second device may include establishing, at the apparatus, an initial ad hoc wireless network communication link with the first device, communicating with an external apparatus, via a network communication link, to cause the external apparatus to establish a subsequent ad hoc wireless network communication link with the second device, and establishing the first ad hoc wireless network communication link via the initial ad hoc wireless network communication link, the network communication link, and the subsequent ad hoc wireless network communication link, such that the apparatus and the external apparatus are both transparent nodes in the first ad hoc wireless network communication link.

The method may further include implementing the rule-based control of the at least one device based on processing a plurality of data packets received at the apparatus, at least one data packet of the plurality of data packets received from the first device via the first ad hoc wireless network communication link.

Rule-based control of the at least one device may be implemented based on extending software defined networking (SDN) to ad hoc network communication between the first device and the second device.

According to some example embodiments, an apparatus may include an ad hoc wireless network communication transceiver configured to establish ad hoc wireless network communication links with a plurality of devices, a memory storing a program of instructions, and a processor. The processor may be configured to execute the program of instructions to establish a first ad hoc wireless network communication link between a first device and a second device, such that the apparatus is a transparent node in the first ad hoc wireless network communication link between the first device and the second device.

The apparatus may further include a network communication interface configured to establish a network communication link with an external apparatus, the external apparatus further configured to establish ad hoc wireless network communication links with a separate plurality of devices. Establishing the first ad hoc wireless network communication link between the first device and the second device may include establishing, at the apparatus, an initial ad hoc wireless network communication link with the first device, communicating with the external apparatus, via the network communication link, to cause the external apparatus to establish a subsequent ad hoc wireless network communication link with the second device, and establishing the first ad hoc wireless network communication link via the initial ad hoc wireless network communication link, the network communication link, and the subsequent ad hoc wireless network communication link, such that the apparatus and the external apparatus are both transparent nodes in the first ad hoc wireless network communication link.

The network communication link may be a local area network communication link or a wide area network communication link.

According to some example embodiments, a method, implemented at an apparatus configured to establish ad hoc wireless network communication links with a plurality of devices, may include establishing a first ad hoc wireless network communication link between a first device and a second device, such that the apparatus is a transparent node in the first ad hoc wireless network communication link between the first device and the second device. The establishing may include establishing an initial ad hoc wireless network communication link between the apparatus and the first device, establishing a subsequent ad hoc wireless network communication link between the apparatus and the second device, and forwarding, at the apparatus, packets between the first device and the second device via the initial and subsequent ad hoc wireless network communication links.

The establishing the first ad hoc wireless network communication link between the first device and the second device may include establishing, at the apparatus, the initial ad hoc wireless network communication link with the first device, communicating with an external apparatus, via a network communication link, to cause the external apparatus to establish the subsequent ad hoc wireless network communication link with the second device, and establishing the first ad hoc wireless network communication link via the initial ad hoc wireless network communication link, the network communication link, and the subsequent ad hoc wireless network communication link, such that the apparatus and the external apparatus are both transparent nodes in the first ad hoc wireless network communication link.

The network communication link may be a local area network communication link or a wide area network communication link.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present example embodiments.

FIG. 5 illustrates packet field and metadata definitions associated with an AHSS that includes a BLESS, according to some example embodiments.

FIG. 6A illustrates an ad hoc network architecture implemented in a healthcare environment that includes at least one AHSS node that provides service slicing, according to some example embodiments.

FIG. 6B illustrates a set of rules that may be installed in the AHSS B2 shown in FIG. 6A, according to some example embodiments.

FIG. 9 illustrates a table showing experimental results indicating differences in round-trip delay time of a request-response packet pair between a central device and a peripheral device through an AHSS node that is configured to implement a BLESS and without passing through the AHSS node, according to some example embodiments.

Figure 1:
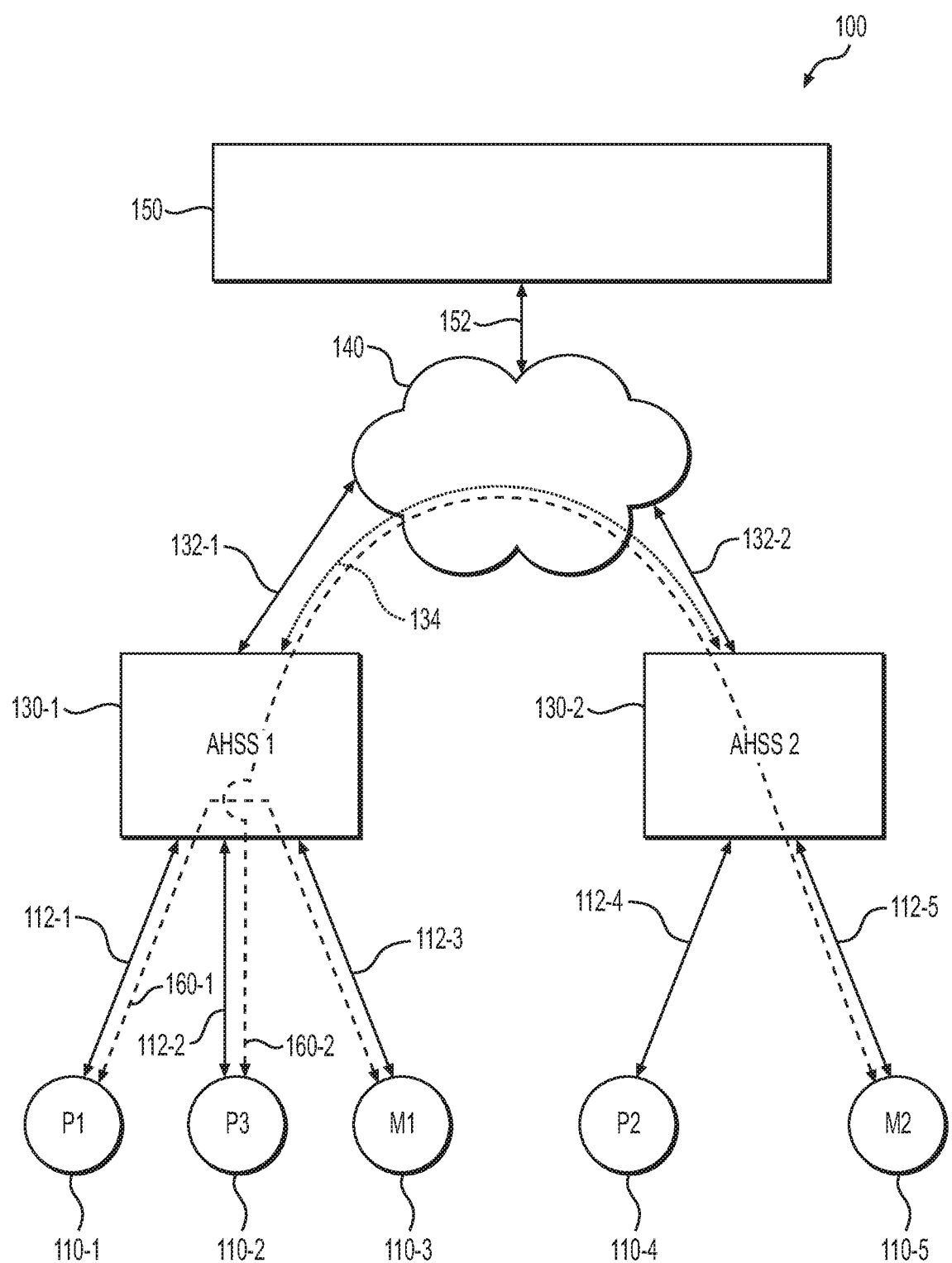
FIG. 1 illustrates an ad hoc network architecture, according to some example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example: existing radio access network (RAN) elements, relay cells, central nodes, centralized RAN servers, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

According to some example embodiments, an apparatus configured to implement an ad hoc service switch (AHSS) enables management of ad hoc transactional relationships in an ad hoc wireless network communication environment based on monitoring and controlling the ad hoc transactions with in-network support and not solely at individual ad hoc devices. The inclusion of such an apparatus, also referred to herein interchangeably as an AHSS apparatus, an AHSS device, an AHSS node, or the like, may enable large-scale deployment of an ad hoc communication environment (also referred to herein interchangeably as an "ad hoc environment" and an "ad hoc network") that includes multiple connected ad hoc devices without entailing changes to ad hoc devices or applications implemented ("executed") by ad hoc devices.

In-network transaction control, including rule-based control, may be enabled based on extending software defined networking (SDN) to ad hoc networking. In some example embodiments, where the ad hoc environment includes a Bluetooth Low Energy (BLE) communication environment including BLE devices linked ("connected") via BLE links, in-network transaction control may be enabled based on extending SDN to BLE networking.

In some example embodiments, an AHSS apparatus may establish an ad hoc link between a first ad hoc device ("first device") and a second ad hoc device ("second device"), such that the AHSS apparatus is a transparent node in the ad hoc link between the first device and the second device. The AHSS apparatus may implement rule-based control of at least some communications between the first and second device via the ad hoc link (e.g., "ad hoc communications between the first and second devices via the ad hoc link"). Such rule-based control may include rule-based control of at least one device of the first device arid the second device, based on processing a data packet received from the first device (a "first data packet") via the first ad hoc wireless network communication link, such that the rule-based control includes performing at least one operation of selectively forwarding the first data packet to the second device, selectively inhibiting the first data packet from being forwarded to the second device, modifying the first data packet and forwarding the modified first data packet to the second device, and generating and transmitting a second data packet to the second device. A data packet may be referred to interchangeably herein as an "ad hoc packet," simply a "packet," or the like. As described herein, a "first device," a "second device," a "third device," some combination thereof, or the like may be a peripheral device and/or a central device.

As referred to herein, a "transparent" node in a link ("communication link) between at least two devices, including at least two ad hoc devices in an ad hoc networking environment, is a node that is configured to provide native support to the devices, using the device protocols of the devices, thereby preserving the native service layer of a native networking environment between the at least two devices (e.g., a native ad hoc service layer of a native ad hoc networking environment between at least two ad hoc devices), without requiring development of special application level or operating system support.

As a result, the transparent node may enable communication between two or more devices via a particular native service layer of a native networking environment, through the node, without requiring any configuration changes in how the two or more devices would normally communicate with each other via the particular native service layer of the native networking environment. Restated, a "transparent" node, in a communication link between two devices, includes a node that enables the two devices to communicate with each other, through the node, using a. native service layer of a native networking environment as if the devices were linked directly to each other, independently of the node, in the native networking environment.

To control ad hoc (e.g., BLE) communication using a set of rules (e.g., implement rule-based control of ad hoc communications between the first and second devices via the ad hoc link), including, for example, using SDN flow rules, the AHSS apparatus may be configured to insert an ad hoc service switch (AHSS) into the datapath between at least two ad hoc devices (e.g., peripheral and central devices) linked via an ad hoc link. The AHSS may be implemented to maintain link layer connections to the ad hoc devices to support peer-to-peer connectivity, but the AHSS may be implemented to control ATP packet flows at the service layer using flow rules that are installed by a central controller.

If and when an AHSS node is configured to operate in a BLE networking environment, the AHSS node may be referred to as a Bluetooth Low Energy Service Switch (BLESS) node that implements a BLESS.

If and/or when the AHSS is a BLESS, the BEE protocol as the data plane and GATT/ATT-centric flow rules for control plane may enable the BLESS to provide improved non-Ethernet-based protocol independent packet processing.

In some example embodiments, the AHSS node may be configured to operate in one or more types of ad hoc networking environments. For example, as noted above, the AHSS node may be configured to operate in a Bluetooth Low Energy (BLE, which may be referred to as Bluetooth Smart®) networking environment. It will be understood that example embodiments of the AHSS node are not limited to operating in the BLE environment. For example, in some example embodiments, an AHSS node may be configured to implement an AHSS that operates in one or more various ad hoc networking environments, including Bluetooth®, Wi-Fi Direct®, one or more various Wireless Ad Hoc Network (WANET) environments, Mobile Ad Hoc Network (MANET) environments, ZigBee® environments, and the like. As referred to herein, an AHSS configured to operate in a particular ad hoc networking "environment" is configured to communicate using the one or more communication protocols associated with the particular ad hoc networking environment.

An AHSS node may be configured to communicate with web services using HTTP directly from the data plane. Incorporating SDN technology may enable IoT-based service automation in an ad hoc network, including a BLE network.

In some example embodiments, the AHSS node enables SDN-based in-network packet monitoring and control for ad hoc network transactions. The AHSS node may implement an AHSS that can transparently reside in between ad hoc device communications over an ad hoc link.

In some example embodiments, an AHSS node may be configured to establish a network communication link with another AHSS node (also referred to herein as an external apparatus that is further configured to establish ad hoc wireless network communication links with a separate plurality of devices". The AHSS node may be configured to establish an ad hoc link between the first and second devices, as noted above, based on 1) establishing, at the AHSS node, an initial ad hoc link ("connection") with the first device, communicating with the other AHSS node, via the network communication link (e.g., an IP backhaul connectivity), to cause the other AHSS node to establish a subsequent ad hoc link with the second device, and establish the ad hoc link via the initial ad hoc link, the network communication link, and the subsequent ad hoc link, such that the AHSS node and the other AHSS node are both transparent nodes in the ad hoc link connecting the first and second devices.

AHSS Architecture

Figure 2:
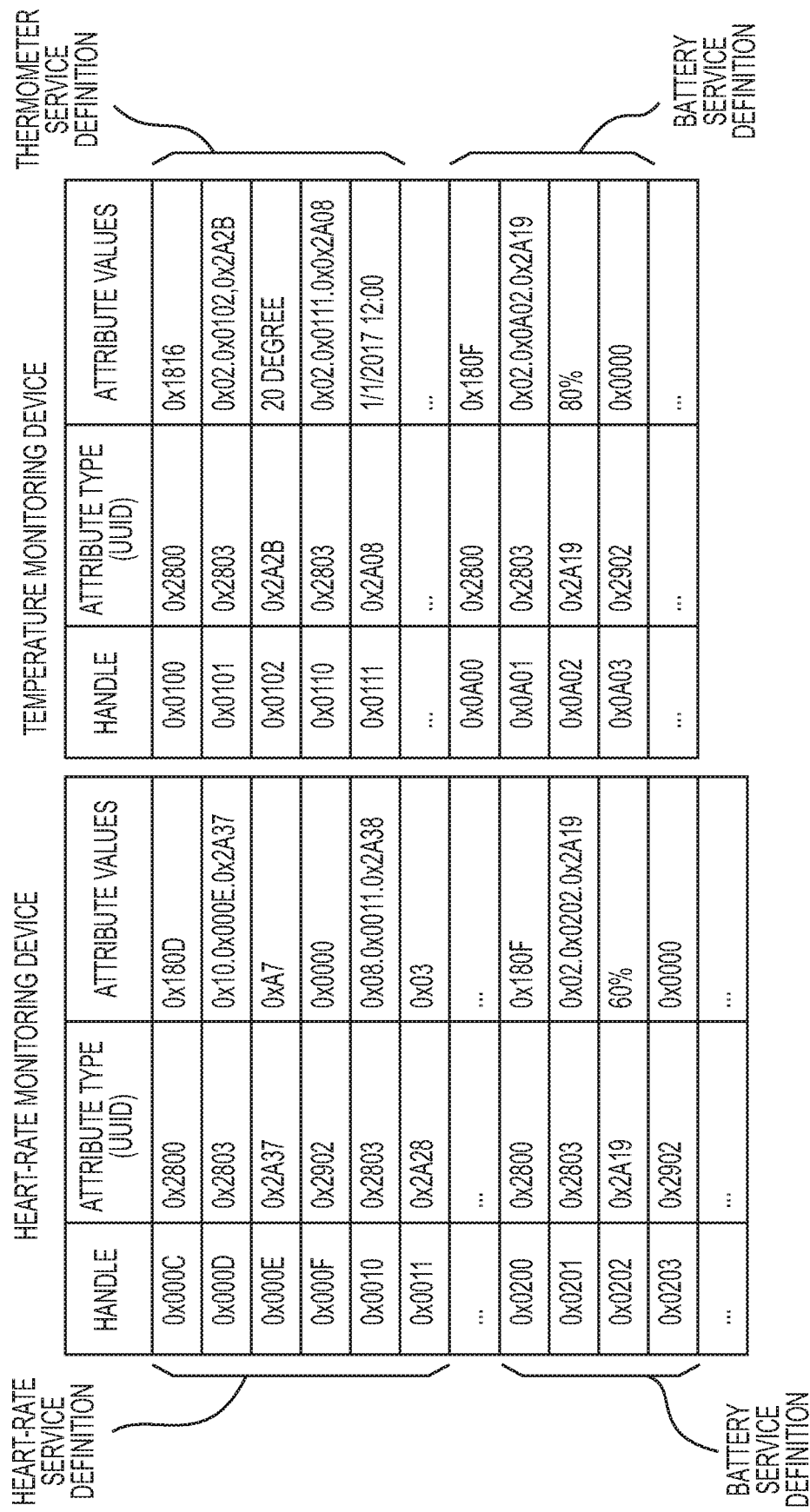
FIG. 2 illustrates GATT service profiles of ad hoc devices communicating in an ad hoc network, according to some example embodiments.

FIG. 1 illustrates an ad hoc network architecture 100 that includes apparatuses (AHSS nodes) configured to implement ad hoc service switches (AHSS) to enable ad hoc links between multiple devices through the apparatuses and to further implement rule-based control of the ad hoc links, according to some example embodiments. FIG. 2 illustrates GATT service profiles of two separate ad hoc devices communicating in an ad hoc network, according to some example embodiments. Such ad hoc devices may include any of the ad hoc devices 110-1 to 110-5 illustrated in FIG. 1. In the example embodiments shown in FIG. 2, the two separate ad hoc devices are a heart-rate monitoring device and a temperature monitoring device. But, it will be understood that the example embodiments of ad hoc devices associated with GATT service profiles are not limited to these ad hoc devices shown in FIG. 2.

An ad hoc link ("connection") as described herein may include a Bluetooth Low Energy (BLE) link, and an AHSS may include a Bluetooth Energy Service Switch (BLESS) configured to implement rule-based control of one or more BLE links between at least two devices through the BLESS.

As shown in FIG. 1, the ad hoc network architecture 100 may include a plurality of ad hoc devices 110-1 to 110-5 configured to establish one or more ad hoc wireless network communication links (referred to herein as simply "ad hoc links"), apparatuses (AHSS nodes 130-1 and 130-2) that are each configured to implement an AHSS, a central controller device 150, and a communication network 140 to which the AHSS nodes 130-1 and 130-2 and central controller device 150 are communicatively coupled via network communication links 132-1, 132-2, and 152, respectively.

In some example embodiments, an ad hoc device, including a BLE device, may be a peripheral device and/or a central device. In example embodiments where the network architecture 100 is in a health care environment, for example, an ad hoc device that is a peripheral device may include a heart rate monitor, a blood pressure monitor, a weighing machine, some combination thereof, or the like, and an ad hoc device that is a central device may include a smart phone, a tablet, a laptop, some combination thereof, or the like. A central device may be configured to access or modify data received from the peripheral devices.

As shown in FIG. 1, in some example embodiments an AHSS node is configured to establish an ad hoc network link between two ad hoc devices, such that the AHSS node is a transparent node in the ad hoc link between the two ad hoc devices. For example, as shown in FIG. 1, AHSS node 130-1 has established ad hoc links 112-1 to 112-3 with ad hoc devices 110-1 to 110-3, respectively. In addition, AHSS node 130-2 has established ad hoc links 112-4 to 112-5 with ad hoc devices 110-4 to 110-5, respectively.

As referred to herein, an ad hoc device 110-1 to 110-5 may include any device configured to establish and communicate over an ad hoc network link. An ad hoc device may include a peripheral device and/or a central device. In the example embodiments shown in FIG. 1, for example, ad hoc devices P1-P3 (ad hoc device 110-1, ad hoc device 110-4, and ad hoc device 110-2) are configured to operate as peripheral devices. In addition, ad hoc devices M1-M2 (ad hoc device 110-3 and ad hoc device 110-5) are configured to operate as central devices.

As further shown in FIG. 1, AHSS node 130-1 may establish an ad hoc link 160-1 between ad hoc devices 110-1 and 110-3 via the AHSS node 130-1, such that the ad hoc link 160-1 includes ad hoc links 112-1 and 112-3 between the ad hoc devices 110-1 and 110-3 and the AHSS node 130-1, respectively. Furthermore, the AHSS node 130-1 may be a transparent node in the ad hoc link 160-1 between ad hoc devices 110-1 and 110-3.

Thus, as shown in FIG. 1 with regard to at least AHSS node 130-1, an AHSS node may be interposed between any two communicating ad hoc devices in an ad hoc link therebetween. Such an AHSS node may be configured to implement an AHSS to then act as a programmable software switch to implement rule-based control of the ad hoc communication between the connected ad hoc devices.

In some example embodiments, including the example embodiments shown in FIG. 1, multiple AHSS nodes 130-1 and 130-2 may be configured to communicatively couple with each other via a communication network 140, also referred to herein as a backhaul network, such that an ad hoc link may be established between ad hoc devices communicatively coupled to separate, respective AHSS nodes via tunneling (e.g., IP tunneling) through at least the backhaul network.

As shown in FIG. 1, for example, AHSS node 130-1 is linked to ad hoc device 110-2 via an ad hoc link 112-2, and AHSS node 130-2 is linked to ad hoc device 110-5 via a separate ad hoc link 112-5. In addition, AHSS nodes 130-1 and 130-2 are each linked to the communication network 140 ("backhaul network") via separate, respective network communication links 132-1 and 132-2.

Therefore, in some example embodiments, the AHSS nodes 130-1 and 130-2 may be communicatively linked to each other (e.g., via network communication link 134) through communication network 140. Thus, the AHSS nodes 130-1 and 130-2 may be configured to establish an ad hoc link 160-2 between ad hoc devices 110-2 and 110-5 such that the AHSS nodes 130-1 and 130-2 are both interposed into the ad hoc link 160-2 that extends through the network communication link 134 (e.g., via IP tunneling) and are both transparent nodes in the ad hoc link 160-2.

As referred to herein, communication network 140 may include a local area network (e.g., "Ethernet") that is geographically restricted (e.g., an individual building, campus, portion of a building, some combination thereof, or the like), such that communication links 132-1, 132-2, and 152 may be local area network communication links. In some example embodiments, the communication network 140 may include one or more various types of communication networks, including a wide area network (e.g., "Internet"), such that communication links 132-1, 132-2, and 152 may be wide area network communication links. In some example embodiments, the communication network 140 may be one or more TCP/IP data networks, including one or more of a wide area network, a local area network, a metropolitan area network, a virtual private network, an Internet area network, a campus area network, some combination thereof, or the like. In some example embodiments, the communication network 140 may include an optical transport network.

As shown in FIG. 1, multiple as AHSS nodes may be interconnected with a backhaul IP network to form the data plane of ad hoc network infrastructure. In such a network deployment, an AHSS node may implement an AHSS that includes multiple components.

Ad Hoc Communication

Ad hoc communication may include a connection-oriented peer-to-peer communication technology where ad hoc devices include peripheral devices and central devices that may communicate in a peer-to-peer fashion. Prior to communication, peripheral devices announce their discoverability and connectability via ad hoc advertisement packets. Any central device listening to the advertisement can initiate a link layer connection with the peripheral device. As referred to herein, ad hoc communication may include Bluetooth Low Energy (BLE) communication.

Based on a link layer connection being established, higher layer communication in both directions may be enabled. In the ad hoc communication, an ad hoc device may be identified using a bit address. Device addresses can be of two types: A public device address that never changes, and/or a random address that may change during device boot up. Once a connection is set up, the peripheral device may stop advertising.

In some example embodiments, a central device that runs a client application may send requests to a peripheral device for the services the peripheral device supports. Such a request may be referred to as a request for one or more particular sets of data from the peripheral device, including data associated with one or more particular service profiles ("service identities") of the peripheral device. The peripheral device, running as a server, may respond. A central device may connect to multiple peripheral devices, giving rise to a star topology.

In some example embodiments, including embodiments where the ad hoc communication is BLE communication, since BLE version 4.1, a peripheral device may be configured to connect (e.g., establish an ad hoc link) to multiple central devices simultaneously. Connectivity (ad hoc links) to central devices by a peripheral device may be restricted by white-listing only the allowed central devices. In some example embodiments, ad hoc devices may be bonded such that a peripheral device advertises only for the central device that the peripheral device intends to connect to. If and/or when the ad hoc communication does not support packet routing natively (e.g., BLE communication), reachability from an ad hoc device to other ad hoc devices may be severely limited unless the devices are directly connected.

In some example embodiments, an ad hoc wireless network communication system, including BLE, may be configured to run a Logical Link Control and Adaptation Protocol (L2CAP) that may be used for multiplexing different higher layer protocols and keeping them oblivious to link layer's packet structure through fragmentation and reassembly.

The Generic Attribute Profile (GATT) layer provides a data abstraction and service description model for a BLE device using attributes expressed as key-type-value tuples.

FIG. 2 shows the service profiles of two ad hoc devices expressed in GATT layer. As shown in FIG. 2, each of the ad hoc devices may include two or more service profiles, represented by the "service definitions" in the ad hoc devices of FIG. 2. As shown, the heart-rate monitoring device may have a heart-rate service profile ("service definition") and a battery service profile, while the temperature monitoring device may have a thermometer service profile and a battery service profile. Separate sets of data generated by an ad hoc device may be associated with a particular one or more service profiles of the ad hoc device. Data associated with a particular service profile may be provided to an authorized requesting device based on the service profile associated with the request. The attribute key is a 16 bit handle used to access it. The type is a universally unique identifier (UUID) which can be 128 or 16 bits. The UUID will be referred to herein, with regard to some example embodiments, as being 16 bits only, but it will be understood that the example embodiments of the UUID are riot limited to 16 bits.

In some example embodiments, GATT runs atop the Attribute Protocol (ATT). ATT is a stateless transaction-oriented command-response protocol used to exchange the attributes between peers on top of L2CAP. ATT commands can be of three types, namely, Read, Write and Notify. In some example embodiments, ATT maintains strict sequencing of requests, such that, in response to a determination that there is any outstanding response from a peripheral device, no further requests are permitted to be sent to it until the response is received.

In some example embodiments, a peripheral device may provide one or more services using GATT profiles (either vendor or Bluetooth SIG defined), and exposes the service(s) to the world by behaving like a server at the L2CAP layer. A central device may connect to the peripheral at the L2CAP layer and accesses the service using ATT transactions.

In some example embodiments, including example embodiments where an ad hoc device is a BLE device, access control to a device in BLE may be at least partially limited to the link layer during connection setup. As a consequence, once a central device gets connected to a peripheral device via BLE, the central device may access any service offered by the peripheral device.

IoT Services Provided by AHSS Nodes

In some example embodiments, network architecture 100 is configured to provide an IoT service based on including at least one AHSS node configured to establish transactional relationships between central devices and peripheral devices to enable a central device to read/write parameters of the service profiles offered by the peripheral devices. For example, a native BLE-based patient vitals monitoring service may be created by an application running on a tablet (e.g., "central device") that transacts (i.e., communicates) with heart rate and blood pressure monitors' (e.g., "peripheral devices'") service profiles, and reports them on a GUI for each patient. A particular service may be associated with a particular service profile of one or more ad hoc devices.

In some example embodiments, based on a central device establishing a link layer connection to a peripheral device, the central device may be configured to access all the services that the peripheral device supports. In some example embodiments, an AHSS node is configured to offer flexibility in service creation based on enabling dynamic control of the access to the service profile (or different sub-profiles within a profile) based on a determined role of the central device and/or the peripheral device (e.g., a determined identity associated with the central device and/or peripheral device, a determined service profile associated with the central device and/or peripheral device, some combination thereof, or the like).

In some example embodiments, an AHSS node is configured to implement an AHSS to apply rule-based policy control at the service layer of ad hoc communication where service profiles are maintained and accessed. If and/or when the AHSS is a BLESS implemented by a BLESS node, the BLESS node may be configured to apply policy control at the service layer of BLE (composed of ATT and GATT).

As a result, a clear separation between connectivity and service may be maintained based on policy control being applied at the service layer. Thus, even if a peripheral device is connected to multiple central devices, accessibility to various service profiles of the peripheral device by various central devices may be controlled, by the AHSS node, based on an identity and/or service profile(s) associated with the peripheral device and/or the central devices attempting to access said service profiles. The access policy implemented by an AHSS node may be dynamically modifiable from SDN's central controller, thereby enabling new services to be added and existing services to be modified without interrupting ongoing services.

In some example embodiments, an AHSS node, implementing an AHSS, enables inspection of packet flow between ad hoc devices connected via an ad hoc link, thereby enabling rule-based policy enforcement. The AHSS node may implement the AHSS as a switch in an ad hoc network that is transparently inserted between ad hoc devices without violating any ad hoc communication protocol. The AHSS implemented by an AHSS node may reside in the data plane, may have access to the full protocol stack, and may be implemented to enforce policy at the service layer. Thus, the AHSS may enable application of rule-based policy control as ATT packets flow through the AHSS node between devices in a peer-to-peer protocol (e.g., an ad hoc communication protocol, which may include BLE) that otherwise does not require packet forwarding using an intermediary switch between the communicating devices.

In some example embodiments, an AHSS node is configured to implement an AHSS that behaves as a central device to a peripheral device and as a peripheral device to a central device. Thus, unlike IP protocol based SDN switches, the AHSS node may provide improved utility in ad hoc environments (e.g., BLE) that is natively connection oriented between peers, relative to IP protocol based SDN switches including a connectionless architecture.

To behave as a peripheral device, an AHSS node implementing an AHSS may be configured to advertise on behalf of a peripheral device that is connected to the AHSS node via an ad hoc link. To behave as a central device, an AHSS node implementing an AHSS may be configured to maintain a link layer connection with each peripheral device within range of the AHSS node. In some example embodiments, to behave as a peripheral device, an AHSS node may be configured to maintain one connection per peripheral device that the central device needs to communicate with, thereby enabling multiplexing across different peripheral devices.

In some example embodiments, an AHSS node implementing an AHSS may be configured to transparently break the native peer-to-peer connection model and to "forward" packets (e.g., forward a first data packet received from a first device to a second device over an ad hoc link between the devices). To this end, an AHSS node implementing an AHSS may be configured to adapt metadata structures and exploit ATT protocol's serialization to resolve correct packet addressing and forwarding.

Once an AHSS node implements an AHSS that is inserted in a network of ad hoc devices, a central controller (e.g., central controller device 150 in FIG. 1) may push ATT and GATT layer service rules into the AHSS in real-time. The AHSS may employ a stateless match-action packet forwarding model to examine each packet, and then to apply the action of the matched rule that enforces access and policy control.

In some example embodiments, an AHSS node may include backhaul network communication (e.g., backhaul IP) connectivity so that multiple AHSS nodes (e.g., AHSS nodes 130-1 and 130-2 in FIG. 1), and thus multiple AHSSs, can be connected over an IP network (e.g., communication network 140 in FIG. 1).

Based on a peripheral device being connected with an AHSS node via an ad hoc link (e.g., an "initial" ad hoc link), the central controller may determine the set of AHSS nodes that should announce on behalf of the peripheral device via ad hoc advertisements. This may make the peripheral device "reachable" to a central device that is connected to a remote AHSS node which is beyond the peripheral device's physical ad hoc communication range. If and/or when the central device wants to connect to the peripheral device (e.g., establish a "subsequent" ad hoc link), the central device may simply respond to the advertisement packet originating from the local AHSS node.

For example, in FIG. 1, AHSS node 130-2 may be configured to advertise for peripheral device P3 (ad hoc device 110-2) and permit central device M2 (ad hoc device 110-5) to connect to peripheral device P3 (e.g., ad hoc link 160-2) even though the two ad hoc devices may be relatively far apart and furthermore may be outside the respective direct ad hoc communication ranges of each other. Thus, the ranges at which separate ad hoc devices may be linked via an ad hoc link may be extended, based on the interposing of one or more AHSS nodes implementing one or more AHSSs. If and/or when peripheral and central devices are connected to two different AHSS nodes and the central controller device includes an SDN controller, the central controller device may install, at one or more of the AHSS nodes, forwarding rules configured to be implemented by the one or more AHSS nodes to carry packets from one AHSS node to another AHSS node within an IP tunnel.

In some example embodiments, an AHSS node may provide improved utility with regard to cloud-based services for IoT devices, as the AHSS does not need to report every IoT transaction to a cloud-hosted application to then device on the follow-up action (executed in terms of another transaction) based on the policy. Thus, an AHSS node is configured to enable device-to-device ad hoc communication without requiring that all such communications be exposed to the cloud In some example embodiments, an AHSS node is configured to be integrated with a network "cloud" using network connectivity (e.g., backhaul IP connectivity) and appropriate protocol converter.

In some example embodiments, an AHSS node may enable ad hoc device-to-device communications without requiring running an ad hoc environment's native service layer (e.g., ATT/GATT with regard to BLE) over IPv6, thereby reducing burdens on resource-contained low power devices and further not requiring changes in the ad hoc network's native implementation (e.g., BlueZ with regard to BLE).

In some example embodiments, an AHSS node may enable more efficient and cost-effective routing, relative to a mesh topology and IP-multicasting for notification, based at least in part upon time-to-time sleep modes of ad hoc devices/nodes (e.g., BLE devices).

An AHSS node may enable extension of a native ad hoc networking environment (e.g., BLE) limited reachability while preserving its native service layer without requiring development of special application level or operating system support (e.g., programming model or virtualization of ad hoc device), as may be required for IP-based ad hoc service gateways that may connect to IoT devices over ad hoc networks as well as a remote service agent over IP, and translates between the ad hoc protocol and a form understood by the service agent. In addition, by using a standard protocol (e.g., a given ad hoc protocol including BLE), an AHSS node may free vendors from defining their own, respective methodologies which, thereby improving interworking.

An AHSS node may be leveraged by a network communication model that shifts host-centric communication to a data centric model to address IP based networking challenges in IoT. The model may leverage the AHSS node to implement "in-network" rule-based policies for IoT communication.

An AHSS node may operate policy control that is transparent to ad hoc devices and is centrally managed, thereby avoiding requiring modifications of native client applications or the central device's ad hoc stack and further without requiring a user's involvement (e.g., setting up device policy, connect to a proxy with a remote IP address, etc.).

AHSS Components

Figure 3:
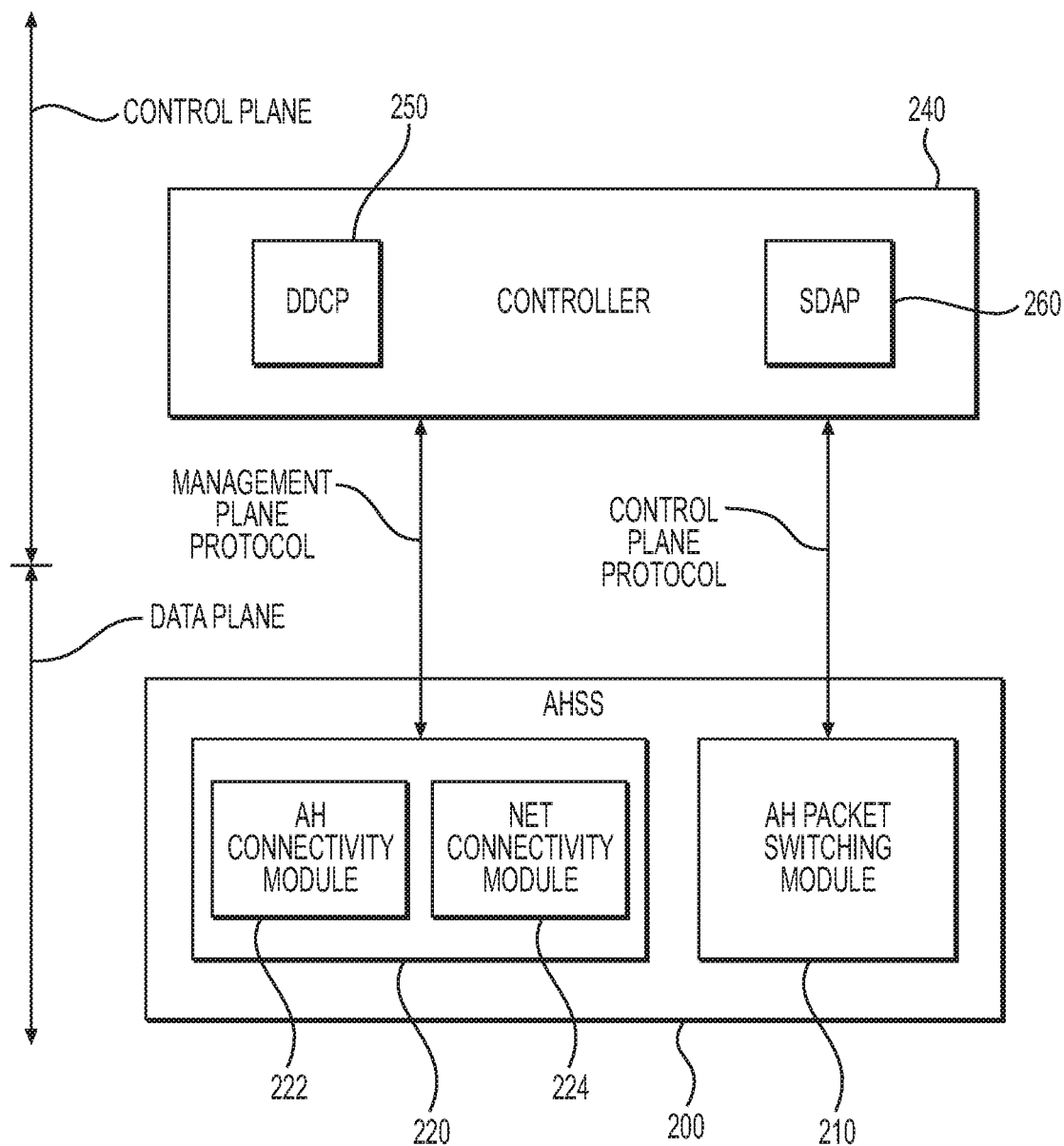
FIG. 3 illustrates functional components of an AHSS implemented by an AHSS node and a central controller, according to some example embodiments.
Figure 4:
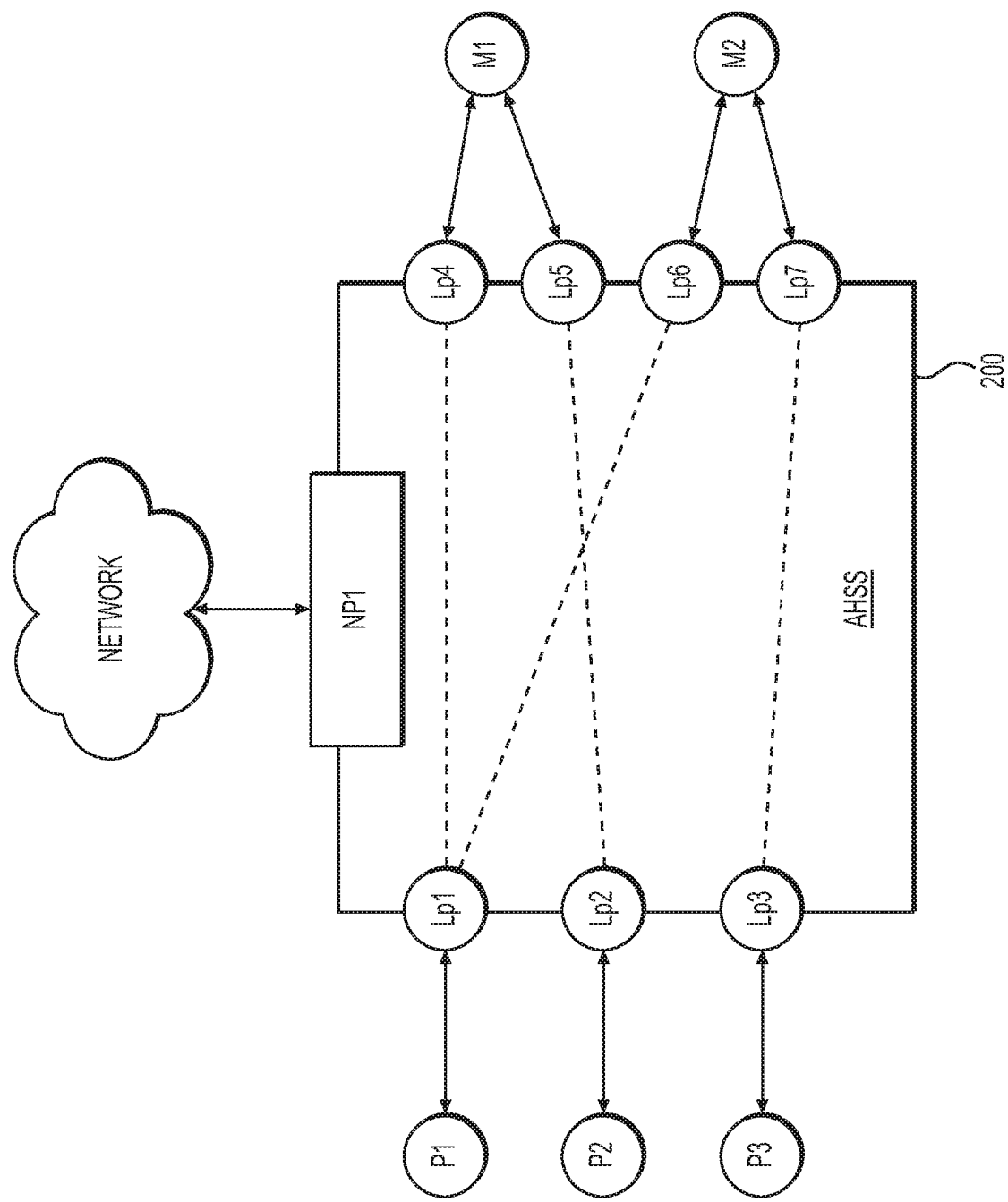
FIG. 4 illustrates link layer connections between an AHSS 200 and ad hoc devices.

FIG. 3 illustrates functional components of an AHSS 200 implemented by an AHSS node and a central controller, according to some example embodiments. FIG. 4 illustrates link layer connections between an AHSS 200 and ad hoc devices. The AHSS 200 shown in FIG. 3 and FIG. 4 may be implemented by one or more of the AHSS nodes 130-1 and 130-2 shown in FIG. 1.

As described herein, an operation that may be performed by an AHSS implemented by an AHSS node may also be referred to interchangeably as an operation that may be performed by the AHSS node itself Similarly, an operation that may be performed by an AHSS node may also be referred to interchangeably as an operation that may be performed by an AHSS implemented by the AHSS node.

As shown in FIG. 3, an AHSS 200 may include multiple functional components: an ad hoc connectivity module 222, a network connectivity module (e.g., "IP connectivity module") 224, and an ad hoc packet switching module 210. The ad hoc connectivity module 222 and network connectivity module 224 may be collectively referred to as AH/NET connectivity modules 220.

The ad hoc connectivity module 222 may create and maintain link layer connections with ad hoc devices within its vicinity, including peripheral devices and central devices. The ad hoc packet switching module 210 may apply rule-based control on native ad hoc communication packets ("packets") communicated between connected ad hoc devices over an ad hoc link therebetween based on a set of one or more match-action rules included in a set of rules. The network connectivity module 224 may create and manage backhaul network connections (e.g., backhaul IP connections) which are used to tunnel ad hoc data packets to other remote AHSS nodes over a communication network (e.g., communication network 140 in FIG. 1, which may be an IP network).

In some example embodiments, the AH/NET connectivity modules 220 are collectively configured to implement AHSS management plane functionality (i.e., creating links/ports), while the ad hoc packet switching module 210 is configured to implement AHSS data plane operations which can be programmed with an OpenFlow-like control plane protocol.

At the link layer, an AHSS 200 implemented by an AHSS node may be configured to provide a transparent one-to-one ad hoc connection between a pair of ad hoc devices, including a pair of peripheral and central devices. To achieve this, the AHSS 200 may be configured to be implemented to operate a designated port on which all advertisements from nearby peripheral devices are received. Upon receiving an advertisement, the ad hoc connectivity module 222 may, by default, forward the advertisement to the controller 240. In some example embodiments, the controller 240 may be included in the central controller device 150 shown in FIG. 1.

The controller 240 may decide whether to accept the advertisement. Based on accepting the advertisement, the controller 240 may instruct the ad hoc connectivity module 222 of the AHSS 200, via a management plane protocol, to set up a link layer connection with the peripheral device and to create a corresponding port (e.g., 1p1, 1p2, 1p3 as shown in FIG. 4). The AHSS 200 may be configured to be implemented to ensure that no other central device directly connects to the advertising peripheral device, via an ad hoc link, for example based on white-listing only the AHSS node in the peripheral device and/or based on adopting an advertisement jamming scheme.

The AHSS 200 may be implemented to advertise on behalf of the connected peripheral device (i.e., using the peripheral device's address). If and/or when multiple AHSS nodes are interconnected via backhaul network connections, depending on connection policies, the controller 240 may send the received advertisement to other remote AHSS nodes as well, so that they can also participate in the advertisement for this peripheral device within their own, respective coverage areas.

In response to receiving an advertisement from an AHSS implemented by an AHSS node, a central device may connect to the AHSS, via an ad hoc link, at the link layer. Since the AHSS may use the same advertisement packet with the same address as received from the peripheral device, the central device and the peripheral devices may be connected via. one or more AHSSs at the link layer transparently to establish an ad hoc link between the peripheral device and the central device.

As a result, when a central device connects to N peripheral devices via an AHSS node implementing an AHSS, where N is an integer that is greater than zero (0), there may be N link layer connections between the central device and the AHSS node. If and/or when the AHSS is a BLESS, the establishment of the N link layer connections may be in conformance with BLE standard 4.1 and later that allows a peripheral device (e.g., an AHSS node implementing a BLESS) to connect with multiple central devices.

In some example embodiments, based on allowing multiple link layer connections from a central device to an AHSS node (instead of a single connection), the client application(s) running on the central device may remain unmodified.

As shown in FIG. 4, the ad hoc connectivity module 222 may create a port for each link layer connection from a central device (e.g., 1p4 and 1p5 for central device M1 and 1p6 and 1p7 for central device M2), which has a one-to-one mapping to a port created for a peripheral device. If and/or when a new port is created for an ad hoc device (e.g., a peripheral or central device), the controller 240 may be notified of this event (e.g., port-status message in OpenFlow). In response, the controller 240 may assign a unique address to the connected ad hoc device.

In some example embodiments, an ad hoc device may be configured to operate as both a peripheral device and as a central device. The device may have one link layer connection with an AHSS node as a peripheral device and one or more link layer connections with the AHSS node as a central device.

A link layer connection between an AHSS node and an ad hoc device may be closed, based on the ad hoc device permanently becoming out of range of direct ad hoc communication or moving away to connect with a different AHSS node. In response to such an occurrence, the ad hoc connectivity module 222 may remove the corresponding port in the AHSS, and the controller 240 may be notified of this event, similar to port creation events. In response, the controller 240 may remove the corresponding match-actions rules across different interconnected AHSS nodes.

A connection ("ad hoc link") may be temporarily dropped and re-established due to weak signal strength, connection timeout from prolonged inactivity, etc. To avoid frequent port deletion/re-addition and spurious rule updates from transient connection failures, the ad hoc connectivity module 222, in some example embodiments, is configured to set a timeout associated with a port (instead of removing the port immediately) in response to a determination that a connection associated with the port is closed. In response to a new connection being re-created within the timeout period using the same device address recorded in the port, the port and its associated rules may be preserved, and the port may be simply updated with the new connection.

In some example embodiments, the ad hoc packet switching module 210 may be configured to, based on an AHSS implemented by an AHSS node being transparently placed in between two communicating ad hoc devices at the link layer, examine ("inspect") the packet flow between the two communicating ad hoc devices at the service layer to enforce rule-based packet forwarding and control.

As described herein, rule-based control may include control based on implementing a set of rules. The set of rules may be stored locally at an AHSS node and may be implemented based on being executed by a processor at the AHSS node.

In some example embodiments, if and/or when the AHSS is a BLESS configured to operate in a BLE environment, while packet forwarding may include per-packet source and destination addresses, the service layer of BLE may use L2CAP packets which are devoid of device addresses.

In some example embodiments, the controller 240 may assign a unique address to each ad hoc device in response to the ad hoc device connecting to the AHSS node. A public or a static device address may be used as-is, since the address may remain fixed for the duration of the connection. Only a random address may be mapped to a fixed ephemeral address by the controller 240 (e.g., by using hashing on some of the device parameters). The address is used globally for addressing a device (including advertisement as described above) and orchestrating flow rule instantiation and packet forwarding while the device is connected to the AHSS. The address may be carried as metadata with a packet in the service layer to make packet forwarding decisions.

In some example embodiments, packets (e.g., first data packets) may be forwarded from a first device to a second device, by default, based on the destination device address. The AHSS may be configured to gather the device address and update the metadata field) based on the port the packet (e.g., "first data packet") comes from. Since a central device may have a unique port to connect to each peripheral device, AHSS may determine the destination peripheral device address of an incoming packet from a central device based on the unique port.

In some example embodiments, a peripheral device may maintain only one connection/port with the AHSS, regardless of how many central devices the peripheral device communicates with via one or more ad hoc links. Thus, an incoming packet from a peripheral device may potentially be destined to any of the central device(s) that it communicates with via one or more ad hoc links. The AHSS may resolve the packet's destination device address, in some example embodiments, based on leveraging ATT's Sequential Protocol feature, which restricts a central device to have at most one outstanding request per peripheral device at any time.

In some example embodiments, to implement rule-based control of ad hoc communications between at least two ad hoc devices, the AHSS may implement a serialization mechanism that emulates a sequential request-response at each peripheral device's port based on controlling the flow of requests from a central device to a peripheral device. The port that is locally connected with the peripheral device may implement this serialization mechanism. In some example embodiments, the port that implements this serialization mechanism may be restricted to the port that is locally connected with the peripheral device.

The AHSS, based on implementing the serialization mechanism, may be configured to uniquely match the response from a peripheral device to the corresponding request, so that the AHSS may determine the destination central device of the response. As a central device may include multiple ports, the central device address alone may not be sufficient to enable forwarding of a response packet. For example, the central device's port address may be used in addition to the central device address, in the implementation of the serialization mechanism, to determine where to forward the response packet from the peripheral device.

The AHSS may be configured to send one ATT request packet at a time until the AHSS receives a response from a peripheral device. In a more pipelined approach, the AHSS may send multiple ATT request packets at a time, so long as the ATT request packets are not conflicting in terms of protocol parameters and source device's address.

In some example embodiments, a few ATT operations (e.g., notification) may not follow the request-response model, and thus the serialization mechanism may not be implemented. Instead, the controller 240 may keep additional state information to determine the destination device address.

While AHSS packet switching may operate on an ad hoc service layer (e.g., on the native BLE service layer if and/or when the AHSS is a BLESS), a backhaul network connectivity may be used to apply rule-based control beyond the limited physical range ("direct ad hoc communication range") of ad hoc devices (e.g., to enable ad hoc communication between a pair of peripheral/central devices connected to two different AHSS nodes)

In some example embodiments, two or more AHSS nodes implementing separate, respective AHSSs may be configured to support network communication. (e.g., TCP/IP protocol stack). Based on two AHSS nodes being interconnected via a network communication tunnel (e.g., an IP tunnel) as part of connection policies, the network connectivity module 224 in either AHSS node may establish a network connection (e.g., a TCP connection, IP connection, etc.) to the other AHSS node, as instructed by the controller 240 and as shown in FIG. 1 via network communication link 134. As shown in FIG. 4, a corresponding port pair (e.g., NP1 in FIG. 4) may be created in these two AHSS nodes, and ad hoc packets (e.g., BLE packets) may be tunneled via this port pair between the AHSS nodes, thereby enabling ad hoc network communication between two separate ad hoc devices that are connected to separate, respective AHSS nodes via separate, respective ad hoc links.

In some example embodiments, where an ad hoc network architecture includes multiple AHSS nodes, such as shown in FIG. 1, each AHSS node may be configured to communicatively link to a controller 240 (e.g., central controller device 150) to enable management plane and control plane operations. As part of enabling management plane functionality, the controller 240 may decide whether to allow an AHSS node (e.g., an AHSS node implementing AHSS 200) to connect to a peripheral device, as well as which pair of AHSS nodes should be interconnected via network tunnels (e.g., IP tunnels).

In response to peripheral/central devices being connected via separate respective ad hoc links, various AHSS nodes, and network connectivity being established among the various AHSS nodes, the controller 240 may perform various control plane operations. For example, the controller 240 may learn ("determine") all of the services each peripheral device linked to one of the AHSSs is configured to offer ("e.g., service profiles" associated with each peripheral device). The controller 240 may, in response to such learning, make the peripheral device discoverable from one or more AHSS nodes (e.g., AHSS 200). The controller 240 may also install flow rules associated with the peripheral device at the relevant AHSS nodes based on application specific policies that can be expressed using SDN programming languages.

As described further below, in some example embodiments, one or more particular management/control plane applications may be implemented by one or more of the controller 240 and an AHSS 200.

For example, in the example embodiments shown in FIG. 3, the AHSS 200 may be a BLESS, such that the AHSS node implementing the AHSS 200 is a BLESS node implementing the BLESS, and the one or more particular management/control plane applications that may be implemented may include two BLE-specific management/control plane applications, namely a Device Discovery and Connection Policy (DDCP) application 250 and a Service Discovery and Access Policy (SDAP) application 260. In the example embodiments shown in FIG. 3, the DDCP application 250 arid the SDAP application 260 may be implemented by the controller 240. In some example embodiments, the DDCP application 250 and the SDAP application 260 may be implemented by the AHSS 200.

If and/or when the ad hoc connectivity module 222 is a BLE connectivity module in a BLESS node, the DDCP application may be implemented to interact with the BLE connectivity module of the BLESS node, such that the BLE connectivity module of the BLESS node is caused to send, to the device implementing the DDCP application, any captured BLE advertisement packet from a peripheral device.

The advertisement packet may contain data that includes the peripheral device's public or random device address and the advertising data. Upon receiving the advertisement packet, the DDCP application 250 may be implemented to determine whether the BLESS node should connect to the peripheral device. In response to a determination that the policy allows such a connection, the DDCP application 250 may be implemented to command the BLESS node to initiate a connection. Once a connection is established, the BLESS node may confirm the connection with the device implementing the DDCP application 250. The DDCP application 250 may, in response, be implemented to assign a unique address for the connected peripheral device and instruct one or more (appropriate) BLESS nodes to advertise on behalf of the peripheral device. The DDCP application 250 may also be implemented to assign a unique address to each newly connected central device.

The SDAP application 260 may be implemented to discover services offered by each peripheral device connected to a BLESS node. In BLE, a service may be expressed in terms of attribute type or universally unique identifier ("UUID") and the associated device-specific handle. The SDAP application 260 may be implemented to build a Handle-UUID map table associated with each peripheral device. Based on the establishment of a connection between a BLESS node and a peripheral device, the SDAP application 260 may be implemented to initiate back and forth exchanges of multiple ATT request-response packets (e.g., find-information request/response) between the peripheral device and the BLESS node, which may result in a Handle-UUID map table associated with the peripheral device.

In some example embodiments, for any declaration type UUID, the SDAP application 260 may be implemented to retrieve the corresponding value. In addition, based on this table and the application-provided policy, the controller 240 may install appropriate match-action rules at different BLESS nodes. In response to a peripheral device being disconnected from a BLESS node, the SDAP application 260 may be implemented to destroy the Handle-UUID map table and update and/or remove associated rules associated with different BLESS nodes accordingly.

In addition to maintaining one or more Handle-UUID map tables, the SDAP application 260 may be implemented to keep any stateful information associated with a peripheral device (e.g., a list of registered central devices for a specific notification service of a peripheral device).

In some example embodiments, data plane operations associated with one or more AHSS nodes (e.g., BLESS nodes) are performed at the ATT/GATT service layer, where a pair of central and peripheral devices may communicate with each other as a client and a server, respectively, for a particular GATT service. The underlying data exchange protocol called ATT may support three categories of ATT commands: read attributes, write attributes and attribute notification.

In some example embodiments, as part of implementing one or more data plane operations, an AHSS node (e.g., a BLESS node) may be configured to block, modify and/or forward one or more ATT packets according to device-specific policies, without violating the semantics of the GATT service-level communication between the connected ad hoc devices. In some example embodiments, as part of implementing one or more data plane operations, an AHSS node (e.g., a BLESS node) may be configured to generate new ATT packets according to device-specific policies, without violating the semantics of the GATT service-level communication between the connected devices. As part of such implementing one or more data plane operations, the AHSS node may utilize a set of match-action rules to apply to ATT packets.

FIG. 5 illustrates packet field and metadata definitions associated with an AHSS that includes a BLESS, according to some example embodiments. Such an AHSS may include one or more of the AHSS nodes 130-1 and 130-2 shown in FIG. 1.

The following description describes packet field and metadata definitions associated with an AHSS, implemented by an AHSS node, with particular regard to an AHSS that is a BLESS. However, it will be understood that at least some packet field and metadata definitions described herein may be used with regard to ad hoc communication via various protocols, including protocols separate from BLE protocol communication.

In some example embodiments, an AHSS node may be configured to implement an AHSS that adopts a particular AHSS protocol communication as the data plane and GATT/ATT-centric flow rules for the control plane. For example, if and/or when the AHSS node is a BLESS node, the BLESS node may be configured to implement a BLESS that adopts BLE protocol communication as the data plane and GATT/ATT-centric flow rules for the control plane. This may make the BLESS node an ideal candidate for exploiting recent advances in protocol independent packet processing, which lay the groundwork for the programmable switch architecture for non-Ethernet traffic.

For example, a BLESS node may build on a programmable, protocol-independent software switch called PISCES which is configured to be implemented to enable a datapath compiler to convert P4-based datapath specifications into a target software switch derived from Open vSwitch. A BLESS node may be configured to address one or more limitations of PISCES' datapath compiler and implement BLESS-specific components (e.g., BLE/IP connectivity modules) and custom actions (e.g., rematch).

P4-Based Datapath Compilation

A P4-based datapath protocol specification (known as a "P4 program") may contain the definitions of several key components of switch processing, including packet headers, parsers, tables, actions and control flows, the combination of which may define the packet processing pipeline of a switch. In some example embodiments, a BLESS node may be configured to implement a P4 program that defines the headers and parsers for processing native BLE packets, and compile it into OVS code base with the PISCES's datapath compiler.

In some example embodiments, BLE ATT command packet definitions in the P4 program implemented by a BLESS node may include the BLE ATT command packet definitions shown in FIG. 5. Different ATT commands can have different packet fields depending on the ATT_opcode in ATT_header which may appear in all ATT packets. The BLESS node may maintain additional per-packet metadata (ATT_metadata), which may contain relevant lower layer information. Such information may include source/destination device addresses (SID/DID), the packet's ingress port (in_port) and total length (Length). The additional metadata fields, enable, Index, and Handle may be used by the BLESS node to implement custom actions.

In some example embodiments, the compiler may include one or more extensions to enable the compiler to be implemented to support the BLESS node. Such extensions may include a variable packet field and/or per-packet metadata.

In some example embodiments, one or more ATT command packets may have a variable length field which may appear as the last field of a packet. For example, as shown in FIG. 5, an ATT write request packet ("ATT_wrq") may have a variable length field called "att_value." In some example embodiments, the width of the field may be set as the maximum possible length, assuming that the MTU of a BLE packet is 23, such that any limitation of the PISCES compiler to being restricted to supporting fixed length fields in header definitions may be overcome.

In some example embodiments, the actual length of a variable field may be derived based on the total length of the ATT packet (Length metadata field).

In some example embodiments, the PISCES compiler may be extended to support persistent packet-level metadata. The datapath compiler may convert metadata definitions in a P4 program as flow-level metadata in OVS. In some example embodiments, if an action modifies any flow-level metadata and applies rematch action, the modified flow-level metadata may be lost during the next match-action process. In some example embodiments, processing a BLE packet with a list of attributes (e.g., read-by-type response) may require metadata to persist across iterative executions of rematch action on the packet.

AHSS (BLESS) Ports

In some example embodiments, a P4-compiled datapath may enable a BLESS node to be configured to process native BLE packets based on match-action rules. In some example embodiments, the BLESS node may be configured to implement a BLE-specific port interface in userspace because the BLESS datapath processes service-layer BLE packets which are userspace packets captured from L2CAP layer sockets. Capturing packets in the BLE kernel space would have the overhead of processing and filtering out different types of irrelevant L2CAP layer packets (e.g., L2CAP empty PDU), which are not part of BLE service layer protocol. As a result, the BLESS node may be configured to implement a BLE-native port interface to receive and transmit BLE packets, which is tied to target software switch implementation (e.g., netdev in OVS).

To implement a BLE-native port interface, a BLESS node may be configured to implement two specializations of the generic OVS netdev port: netdev_ble to receive and transmit BLE data packets, and netdev_adv to receive BLE advertisement packets from peripheral devices. These BLE-specific netdev ports may be created and maintained by a BLE connectivity module of the BLESS implemented by the BLESS node.

As part of port configurations, each BLE netdev port may have an associated file descriptor for either an active L2CAP socket (in case of netdev_ble) or a listening socket (in case of netdev_adv), via which the port may read and write native BLE packets. The file descriptor information in netdev may be persisted in ovsdb-server, and may be updated on the fly (e.g., in response to a temporary connection failure and/or recovery).

As shown in FIG. 5, the netdev_ble port may be implemented by a BLESS node to add metadata ("ATT_metadata") in each ingress packet, which may be removed before the packet is transmitted. Among metadata. fields, DID (destination address) and SID (source address) may be set differently by the port based on the associated target device. If and/or when the port is created for a central device, the port may use fixed DID and SID, as assigned by the controller. In response to a determination that the port belongs to a peripheral device, the port may determine DID of each ingress packet by using serialization, while using fixed SID. To implement serialization, the port may maintain a FIFO queue which enqueues SID of each egress request packet. Then, for each ingress response packet, SID dequeued from the queue may be used as DID for the packet. The serialization may be disabled for a server-initiated ATT packet (e.g., notification), in which case DID remains unassigned and this field is ignored in the match-action rules. As an artifact of the datapath compiler unable to support variable length packets, the netdev_ble port may add padding to each received packet to MTU size, which may be removed before the packet is transmitted.

In some example embodiments, besides handling native BLE packets, a BLESS port interface may be configured to act as a protocol converter between BLE and any non-BLE protocols. Protocol conversion may be implemented to integrate native BLE devices to any non-BLE devices or to a cloud backend. In some example embodiments, one such port called netdev_http port, which converts between BLE and HTTP protocols, may be implemented so that the BLESS implemented by the BLESS node may be integrated with a remote cloud via a RESTful web service API on behalf of connected BLE devices. The netdev_http port may maintain a TCP socket connecting to the API end point, and any other API related parameters. In response to the port receiving a BLE packet from the datapath, the port may package the packet in an API call (e.g., HTTP GET request) and send the packet to the remote end point. In some example embodiments, an API response from the remote end point may be converted by the port to a BLE packet, and injected to the datapath. In some example embodiments, match-action rules may be utilized to perform protocol translation using stateful packet processing in OVS, or define more advanced P4 specifications.

AHSS (BLESS) Actions

A BLESS node may be configured to support a range of actions for rule-based control on BLE packets. These actions may be realized using a set of built-in actions (e.g., output, goto_table) from OVS and a set of primitive P4 actions automatically generated by the datapath compiler (e.g., add_header, remove_header, add_to_field, subtract_from_field, deparse). Some of these primitive actions are used as-is, while others may be used to define more complex compound actions. The following is a list of compound actions implemented in a BLESS that may be implemented by a BLESS node.

In some example embodiments, a BLESS may implement a "block" action. This action may be implemented by the BLESS to block a matching request packet (e.g., inhibit a received first data packet from being forwarded), create an error response packet (e.g., generate and transmit a second data packet) from the packet, and send the response packet back to in_port of the dropped packet. This action may be implemented with a series of remove_header and add_header actions to convert a matching packet into an error response packet, set_field actions to change necessary fields in the response (e.g., swapping DID and STD), deparse and output actions to send the response packet back to in_port.

In some example embodiments, a BLESS may implement a "rematch" action. This action may be implemented to enable a given packet to be re-submitted to the BLESS processing pipeline multiple times. This may be useful when applying match-action rules to the same packet iteratively to policy control ATT commands that carry a variable length list of attributes (e.g., read-by-type response). The number of re-submissions by this action may be controlled based on updating persistent per-packet metadata fields: Index, enable and Handle. That is, each time rematch action is performed on a given packet, Index may be incremented by one, and Handle may be updated to point to the next matching attribute in the attribute list. The enable field (1 or 0) may indicate whether or not it is the last attribute in the list, and is used as a flag to terminate the iteration of rematch action.

In some example embodiments, a BLESS may implement a "remove" action. This action is similar to the aforementioned rematch action, except that it may be implemented to remove a currently pointed handle-value pair from the attribute list.

In some example embodiments, a BLESS may implement a "comparison" action. This action may be implemented to compare a field value with a constant and applies goto_table action based on the comparison result.

Rule-Based AD HOC (BLE) Packet Processing

In some example embodiments, a BLESS node may implement a BLESS to use policy-specific match-action rules based on native BLE packet fields as well as per-packet metadata. As described further below, one or more policy controls for one or more basic NIT commands may be use and may be translated into match-action rules in the BLESS.

As shown in FIG. 5, the read request/response ATT command pair ("ATT_rrq" and "ATT_rrp") may allow a GATT client to read a certain attribute's value from a GATT server using the attribute's handle. The read request packet may contain the attribute handle which, along with a few other fields, may be used by BLESS to find a matching rule. In response to a read request packet being received, the BLESS may be implemented to apply either forward or block action on the packet. In the latter case, the BLESS may send an error response packet to the client with "Read Not Permitted" ATT error code. For a read response packet, the BLESS may apply forward action to send the packet to the client.

As shown in FIG. 5, if and/or when multiple attribute values of a certain attribute type are communicated, client/server may use a pair of read-by-type request/response commands ("ATT_rbtrq" and "ATT_rbtrp"). For a read-by-type request packet, the BLESS may be implemented to apply either forward or block action. For a read-by-type response packet which contains a list of attribute handle and value pairs, the BLESS may remove or modify one or more handle-value pairs in the packet using re-match and remove actions according to policies (e.g., to permit the client to access only a subset of the list).

As shown in FIG. 5, the write request/response command pair ("ATT_wrq" and "ATT_wrp") may allow a client to write a single attribute value at the server based on handle information. In response to a request packet (e.g., first data packet) being received at the BLESS node, the BLESS may perform either block or forward action based on the handle information. A corresponding write response packet (e.g., second data packet) may be simply forwarded to the destination. There may be a special write request used based on a client subscribing to a service attribute for notifications from the server. In this case, the client may send a write request with the attribute handle with client characteristic configuration type (i.e., UUID=0x2902) to the server. If and/or when BLESS applies forward action on such a request, the BLESS may also perform a controller action to send a copy of the packet to the controller (e.g., central controller device 150 as shown in FIG. 1). This may enable the controller to manage the set of client devices (referred to as Notify-Set) that subscribe to the notification for the corresponding service attribute from the server and to push appropriate rules for delivering the same.

In some example embodiments, an attribute notification is a server initiated ATT command that, when implemented, notifies subscribed client(s) that an attribute value has changed. A server may send only one notification packet for an attribute value as it connects to only one BLESS node acting as a central device's client. In response to receiving a notification packet from the peripheral device, a BLESS node may apply forward action on the packet to each subscribing client in the Notify-Set based on rules pushed by the controller.

Service Automation Using AHSS

Referring back to FIG. 1, in some example embodiments, one or more AHSS nodes may be included in an ad hoc network architecture to provide various services. In some example embodiments, an ad hoc network architecture that includes one or more AHSS devices ("AHSS nodes") configured to implement one or more AHSSs may be configured to provide one or more various services that implement control of ongoing transactions from within an ad hoc network that facilitates management of large-scale IoT-based services. As described below, an AHSS node may enable at least one of 1) service slicing, 2) service enrichment and 3) service composition.

Service Slicing

In some example embodiments, an AHSS node interposed between two ad hoc devices in an ad hoc link therebetween (e.g., a first device and a second device linked via a first ad hoc link) may be configured to receive a packet ("first data packet") from the first device, where the packet includes a request for a selected set of data from the second device, and the AHSS node may be configured to implement rule-based control of at least one device based on selectively forwarding the received ("first") data packet to the second device based on determining whether the first device is associated with an authorization to receive the selected set of data (e.g., a determined authorization, associated with the first device, to access data associated with a particular service profile of the second device).

FIG. 6A illustrates an ad hoc network architecture implemented in a healthcare environment that includes at least one AHSS node that provides service slicing, according to some example embodiments. FIG. 6B illustrates a set of rules that may be installed in an AHSS B2 shown in FIG. 6A to implement the administrative professional's service slice (Slice 1 in FIG. 6A) according to some example embodiments.

Referring to FIG. 1, FIG. 6A, and FIG. 6B, a hospital environment may include ad hoc devices (e.g., ad hoc devices 110-1 to 110-5) that include peripheral devices ("peripheral devices"). As referred to herein, an ad hoc device may include a Bluetooth Low Energy (BLE) device. Peripheral devices included in a hospital environment may include one or more devices of heart rate and temperature monitors, typically over two service profiles—one service profile associated with the monitored vitals and one service profile associated with for an ad hoc device battery status.

A medical professional (e.g., a physician, nurse, etc.) may be interested in the vitals of the professional's patients only, while an individual responsible for device maintenance may be interested in accessing the battery status of any ad hoc device but (for privacy reasons) may be desired to be restricted from accessing the vitals.

Thus, it may be desirable to create different network slices ("authorizations") associated with different services ("service profiles") that the devices may be configured to support. A physician's slice may include a registered central device and all the health related services provided by the peripheral devices that connect to this physician's patients only, regardless of the distance (within the premise or outside if and/or when a patient with wearable ad hoc devices is monitored remotely). Thus, the physician's slice may include an authorization to receive, at an ad hoc device (e.g., central device) associated with the physician, sets of data associated with various other ad hoc devices (e.g., peripheral devices) to which the physician's ad hoc device may be linked via one or more ad hoc links. Such selected sets of data may include particular service profiles associated with particular ad hoc devices, including patient health data communicated from various peripheral devices (e.g., patient heartbeat data).

As referred to herein, devices that are "connected" may include devices that are communicatively coupled via one or more ad hoc links. Moreover, the physician may be restricted to accessing the vitals. The native application running on the physician's central device may be configured to (e.g., may be associated with an authorization to) receive notifications only from the peripheral devices within the physician's slice (e.g., receive notifications associated with particular service profiles associated with a particular set of peripheral devices).

Similarly, an administrator's slice may span across his central devices and the battery status service of all the peripheral devices. In some example embodiments, while these two slices may remain isolated at the service layer, the two slices may overlap at the device connectivity layer. Slices may overlap at the service layer, for example, when a patient is monitored by a nurse in addition to the physician. Network service slices may be dynamically created, and may be amenable to frequent and real-time association changes in both central and peripheral devices, and associated services.

In some example embodiments, based on implementing full control of transactions from within an ad hoc network, a service may be enabled based on pushing policy-control flow rules that selectively allow certain groups of transactions (e.g., selectively allow forwarding of certain sets of data and/or data packets) based on the origin of the transactions (e.g., originating device identity and/or associated service profile(s)), destination (e.g., destination device identity and/or associated service profile(s)) and type of query, authorization to receive the queried data, and deny the rest. Use of SDN may ease the manageability and installation of the flow rules in the network. Thus, an issue of an ad hoc central device that connects (at the link layer) to a peripheral having unrestricted access to any profile information, making service slicing and access policing impossible at any layer of ad hoc communication, may be overcome.

In some example embodiments, including the example embodiments shown in FIG. 6A, different, potentially overlapping, GATT-level service slices may be enforced between central devices associated with certain personnel (e.g., hospital personnel including physicians and nurses) and peripheral devices associated with a separate set of personnel (e.g., patients).

In FIG. 6A, central and peripheral devices are connected via ad hoc links to two different AHSS nodes (B1 and B2). Also shown in FIG. 6A are three GATT services (battery, heart rate and body temperature monitors) offered by the peripheral devices, and several slices (shown in dotted rectangles) created to police access to these services by central devices. As evident, slices can be independent (e.g., Slice 1 and Slice 2) or overlapping at various services (e.g., Slice 1 and Slice 3). An AHSS node may be configured to implement an AHSS that ensures that each slice is created and maintained in isolation without interrupting any ongoing services.

FIG. 6B shows a snippet of rules installed in AHSS node B2 to implement the administrative professional's service slice (Slice 1 in FIG. 6A) which is composed of the administrative professional's central device A and the battery services of all the peripheral devices H1, H2, and T2. In this slice, the AHSS node B2 ensures not only that the device A can connect to all remote peripheral devices (e.g., H2 and T2) at the link layer even when A is out of their broadcasting range (Rule1), but also that device A is restricted to accessing the battery status information on the remote peripheral devices (Rule1 and Rule4). The AHSS node B2 may be configured to block any attempt, by device A, to access non-battery related information on the peripheral devices with an error response (Rule2 and Rule3).J Service Enrichment In some example embodiments, an AHSS node interposed between two ad hoc devices in an ad hoc link therebetween may be configured to receive a first data packet from the first device, where the first data packet includes an instance of data, and the AHSS node may be configured to implement rule-based control of at least one device based on selectively forwarding the received first data packet to the second device based on processing the instance of data. The instance of data may be associated with a particular data type and having a particular data value, and the AHSS node may be configured to implement rule-based control of at least one device based on selectively forwarding the received first data packet to the second device based on determining whether the particular data value at least meets a threshold data value of the particular data type that is associated with the second device. In some example embodiments, selectively forwarding the received first data packet to the second device based on processing the instance of data may include selectively forwarding the received data, modifying the received data, etc. based on the content of the data. The first data packet may be selectively forwarded to the second device, for example, based on applying any combination of arithmetic/bitwise operators to any particular data value associated with the received data.

Figures 7A, 7B:
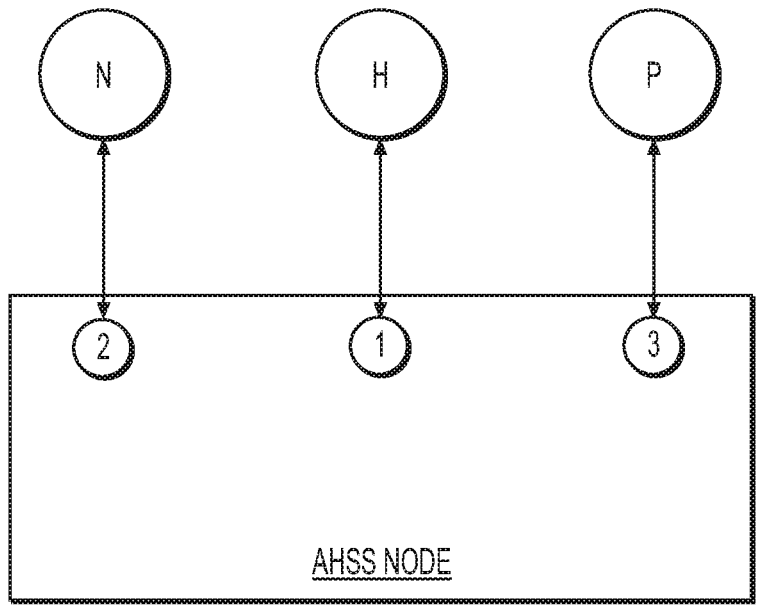
FIG. 7A illustrates an AHSS node connected, via separate, respective ad hoc links, to separate ad hoc devices in a healthcare environment, according to some example embodiments.
FIG. 7B illustrates a set of rules that may be installed in the AHSS shown in FIG. 7A to implement service enrichment with regard to at least some of the ad hoc devices thereto, according to some example embodiments.

FIG. 7A illustrates an AHSS node connected, via separate, respective ad hoc links, to separate ad hoc devices in a healthcare environment, according to some example embodiments. FIG. 7B illustrates a set of rules that may be installed in an AHSS shown in FIG. 7A to implement service enrichment with regard to at least some of the ad hoc devices thereto, according to some example embodiments.

Referring to the above example embodiments illustrated in FIGS. 6A-6B and further referring to the example embodiments illustrated in FIGS. 7A-7B, if and/or when a patient is monitored by both a nurse and a physician, their respective central devices may carry transactional relationships with the same heart rate monitor.

It may be desirable to report the heart rate (e.g., a data value of an instance of heart rate data received from a heart rate monitoring peripheral device "first device") periodically to the nurse, but only the anomalies to the physician (e.g., heart rate data having values above or below some threshold values based on the age of the patient). The heart rate monitor service may be configured to notify the current vital (data value) that can satisfy the nurse's requirement, but not the physician's.

An application at the physician's central device ("second device") may be implemented to filter out unnecessary notifications (e.g., refusing to forward some data packets received from the heart rate monitoring peripheral device ("first device") to the physician's central device ("second device") based on the heart rate values included in the data packets riot at least meeting a particular heart rate value threshold associated with the physician's central device), but this does not reduce the flow of transactions into the physician's central device. Moreover, such an application may be reconfigured for every patient as the threshold depends on the patient's age. Using simple flow rules in the network, one can simply forward all notifications to the nurse's device, and filter out unnecessary transactions for the physician based on the value of the packet field for heart rate, while keeping the native BLE applications unmodified.

In some example embodiments, including the example embodiments shown in FIG. 7A, an ad hoc network may include a peripheral device that is a heart-rate monitoring device (H) that is configured to periodically transmit data packets including information (instances of data) indicating a BPM (heart-beat per minute) of a patient (e.g., a data value associated with a particular data type), to a monitoring app running at a central device that is a nurse's ad hoc device (N) and another central device that is a physician's ad hoc device (P). The monitoring app on both devices may receive every notification from the heartrate monitor.

In some example embodiments, the AHSS node shown in FIG. 7A may be configured to, without touching the native monitoring app on N and P, instantiate device-specific rules in the AHSS node, such that the frequency/condition of notifications provided to particular central devices can be tailored to meet the monitoring requirements associated with different hospital personnel that are themselves associated with particular central devices.

For example, based on the heart-rate monitor being attached to a 65-year-old male patient, the AHSS node may be configured to ensure that the physician receives notifications from the heart-rate monitoring device (H) only when the BPM (data value) indicated in the packets received at the AHSS node from device H is greater and equal to 111 (e.g., a particular data value threshold associated with the 65-yo patient heart-rate data type), which is beyond the normal range in that age group. As shown in FIG. 7B, Rule1 applies comparison action, which selectively passes a matching notification packet to two different tables based on att_notify_value. In table 1 (att_notify_value>111), the AHSS node forwards the notification to both N and P, whereas in table 2, the notification is sent to N only.

In a large-scale hospital environment which involves many peripheral and central devices, notification policies can be fully tailored and easily updated from the central controller to the AHSS node based on origin peripheral devices and target central devices.

In some example embodiments, an AHSS node may implement rule-based control of at least one ad hoc device based on processing a plurality of data packets received at the AHSS node. For example, referring to the example embodiments shown in FIGS. 7A-7B, an AHSS node may process multiple data packets received from the heart rate monitoring peripheral device over time to determine multiple heart rate values communicated from the peripheral device over time. The AHSS node may selectively forward a received data packet from the peripheral device to a physician's central device based on a determination, for example, of whether the plurality of heart rate values indicate a rate of change of heart rate values over time that exceeds a threshold rate of change value.

Service Composition

In some example embodiments, an AHSS node interposed between two ad hoc devices in an ad hoc link therebetween may be configured to establish a second ad hoc link between the first device and a third device, such that the AHSS node is a transparent node in the second ad hoc wireless network communication link, and implement rule-based control of the third device based on generating, at the AHSS node, a data packet that is transmitted to the third device based on processing a data packet communicated from the first device to the second device via the first ad hoc wireless network communication link.

Figures 8A, 8B:
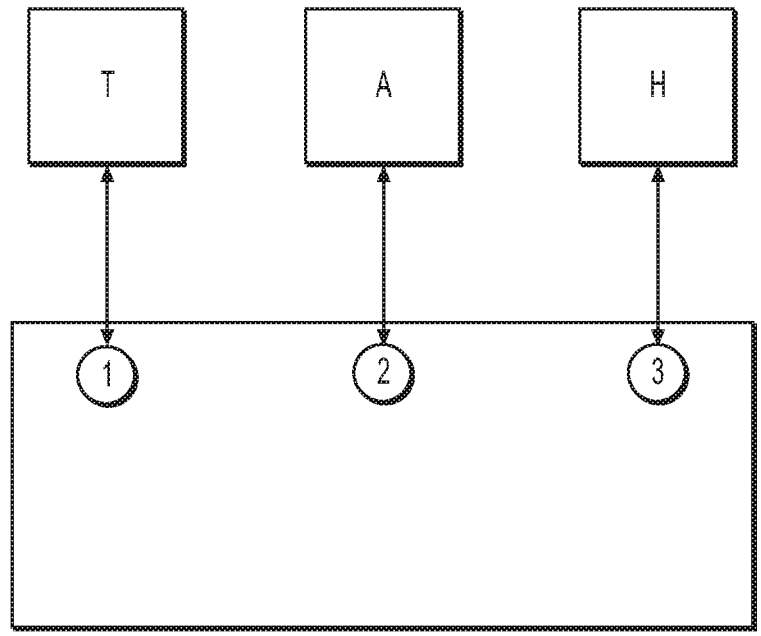
FIG. 8A illustrates an AHSS node connected, via separate, respective ad hoc links, to separate ad hoc devices in a home environment, according to some example embodiments.
FIG. 8B illustrates a set of rules that may be installed in an AHSS shown in FIG. 8A to implement service composition with regard to at least some of the ad hoc devices thereto, according to some example embodiments.

FIG. 8A illustrates an AHSS node connected, via separate, respective ad hoc links, to separate ad hoc devices in a home environment, according to some example embodiments. FIG. 8B illustrates a set of rules that may be installed in an AHSS shown in FIG. 8A to implement service composition with regard to at least some of the ad hoc devices thereto, according to some example embodiments.

Referring to FIG. 1 and further to FIGS. 8A-8B, in some example embodiments, an ad hoc network may be included in a smart home environment that includes a plurality of ad hoc devices. Such ad hoc devices may include a smart thermostat ("first device"), an outdoor smart air conditioning unit ("second device"), and a dehumidifier ("third device").

The smart thermostat (a central device) may be linked to the outdoor smart air conditioning unit via a first ad hoc link and may be configured to control the outdoor smart air conditioning unit (a peripheral) based on turning the outdoor smart air conditioning unit on or off based on a determination, at the smart thermostat, that the indoor temperature rises above or falls below a set threshold value. A simple ad hoc application may be implemented to perform this task quite efficiently.

In addition, the dehumidifier may be included in a basement and may be configured to operate continuously except when the air conditioner comes on, in order to save energy by not duplicating the dehumidification service. The dehumidifier may be connected to a smart power socket (a peripheral).

In some example embodiments, the smart thermostat may be linked to the dehumidifier over a second ad hoc link via the AHSS node, and the AHSS node may be configured to generate and transmit a packet ("second data packet") to the dehumidifier over the second ad hoc link based on processing packets ("first data packets") communicated from the smart thermostat to the outdoor air conditioner unit via the AHSS over the first ad hoc link. For example, in response to determining that a first data packet received from the smart thermostat includes a "turn on" transaction from the thermostat to the air conditioner, the AHSS may generate a new "turn off" transaction ("second data packet") to be transmitted to the smart socket (and vice versa), thereby addressing the issue that the smart thermostat may be restricted from turning the dehumidifier on or off without changing its native application.

In some example embodiments, including the example embodiments shown in FIGS. 8A-8B, an AHSS node may be connected, via separate, respective ad hoc links, to a thermostat, an air conditioning unit (AC), and a dehumidifier. The thermostat, configured to operate as a central device, may be unable to control both the AC and the dehumidifier simultaneously via ad hoc links. In some example embodiments, an AHSS architecture may be configured to instantiate rules in the AHSS node, including the rules shown in FIG. 8B, to configure the AHSS node to keep either the AC or the dehumidifier switched on, but not both, to save energy at home. According to Rule1, when a "turn-on" ATT write request is forwarded from the thermostat to the AC, a copy of this request is sent to table 1 as well, where it is modified to a "turn-off" ATT write request for the smart power socket, and sent out by Rule2. These rules implement a new service interaction whereby turning on the AC automatically shuts down the dehumidifier. Similar rules can be defined for turning off the AC.

Performance

User Perceived Delay

FIG. 9 illustrates a table showing experimental results indicating differences in round-trip delay time of a request-response packet pair between a central device and a peripheral device through an AHSS node that is configured to implement a BLESS and without passing through the AHSS node, according to some example embodiments.

If and/or when an ad hoc network is a BLE network, connection Interval (CI) may be a key parameter of the BLE link layer that influences the packet round-trip delay on a connection between two devices. The CI may range from 7.5 ms to 4.0 s. An AHSS that is configured to implement a BLESS (e.g., a BLESS node) may maintain two such connections ("ad hoc links"): one between the central device and the BLESS node (C⇔B), and another connection between the BLESS node and the peripheral device (B⇔P). While the BLESS node (as a central device) may control the CI for (B⇔P), the CI for (C⇔B) may be set by the central device, and may not be under control of the BLESS node.

FIG. 9 shows experimental results of end-to-end round trip delays for read request/response and read-by-type request/response (with 7 attributes) transactions, with and without a BLESS node, when the CI values vary. For a direct connection between devices without a BLESS node, CI of (C⇔P) is set to the same as that of (C⇔B) for the above mentioned reason. Note that with the BLESS node between the central device and the peripheral device in a BLE link, juxtaposing the two CI values yields the same result, and is not shown in FIG. 9.

With the BLESS node between the central device and the peripheral device in a BLE link, the overall round-trip delay may be influenced by the link layer connection with a relatively higher CI (C⇔B in the experiment). The read-by-type request/response transaction incurs more overhead compared to the read request/response transaction as a BLESS node recirculates the response packet multiple times in the pipeline, but the additional delay may be marginal. As shown in FIG. 9, having a BLESS node in the middle hardly lengthens the round-trip delay, compared to the direct connection scenario. This trend is more prominent with higher values of CI, which is more common in practice.

Processing Time within BLESS

Figure 10A:
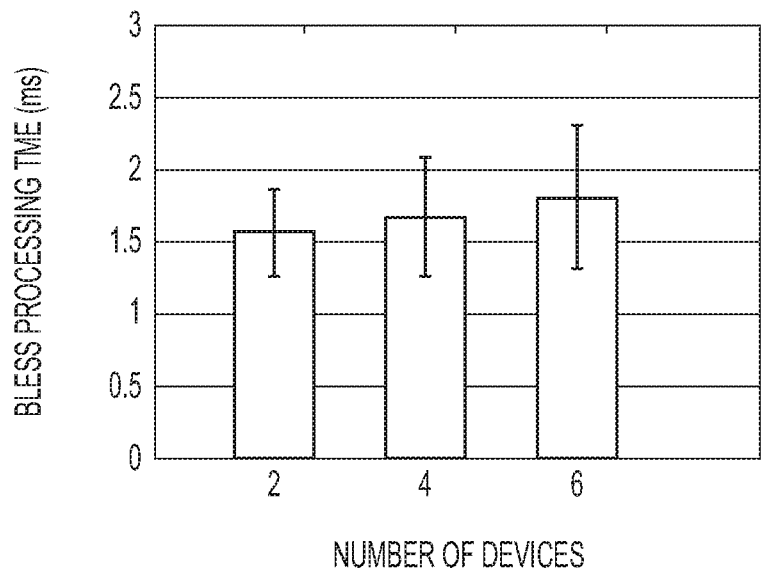
FIG. 10A illustrates packet processing delay of read-request-response transactions in an AHSS node implementing a BLESS for different quantities of connected peripheral devices and central devices, according to some example embodiments.
Figure 10B:
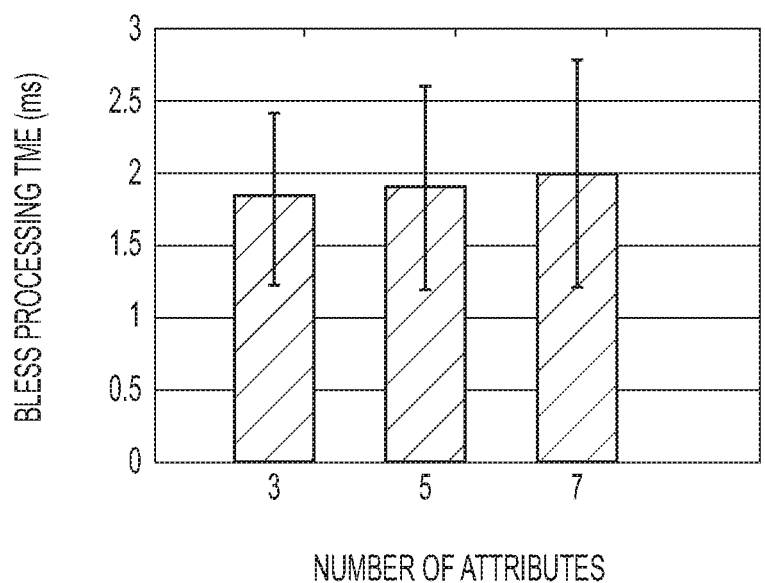
FIG. 10B illustrates packet processing delay of iterating a read by type response packet in an AHSS node implementing a BLESS for different quantities of attributes, according to some example embodiments.

FIG. 10A illustrates packet processing delay of read-request-response transactions in an AHSS node implementing a BLESS for different quantities of connected peripheral devices and central devices, according to some example embodiments. FIG. 10B illustrates packet processing delay of iterating a read by type response packet in an AHSS node implementing a BLESS for different quantities of attributes, according to some example embodiments.

FIGS. 10A-10B are based on the same experimental results illustrated in FIG. 9, and are further based on the AHSS node timestamping all ingress/egress packets and calculating the time spent by a packet in the AHSS node.

FIG. 10A shows that per-packet processing increases slightly with load. FIG. 10B shows that per-packet processing time in an AHSS node can vary depending on the packet contents. For example, based on an ATT packet carrying a list of attributes, an AHSS node may apply rematch action to iterate through the list. The number of iterations performed to process such a packet may depend on the number ("quantity") of attribute values in the list.

FIG. 10B shows that the delay overhead may increase marginally as the number of attributes increases. An ATT command packet may have at most seven attributes in the list due to MTU restriction. Based on comparing the first bar in FIG. 10A and the last bar in FIG. 10B (the overhead of read-by-type command) a determination may be made that the compared bars differ by about 1 ms, which is consistent with FIG. 9.

Electronic Device

Figure 11:
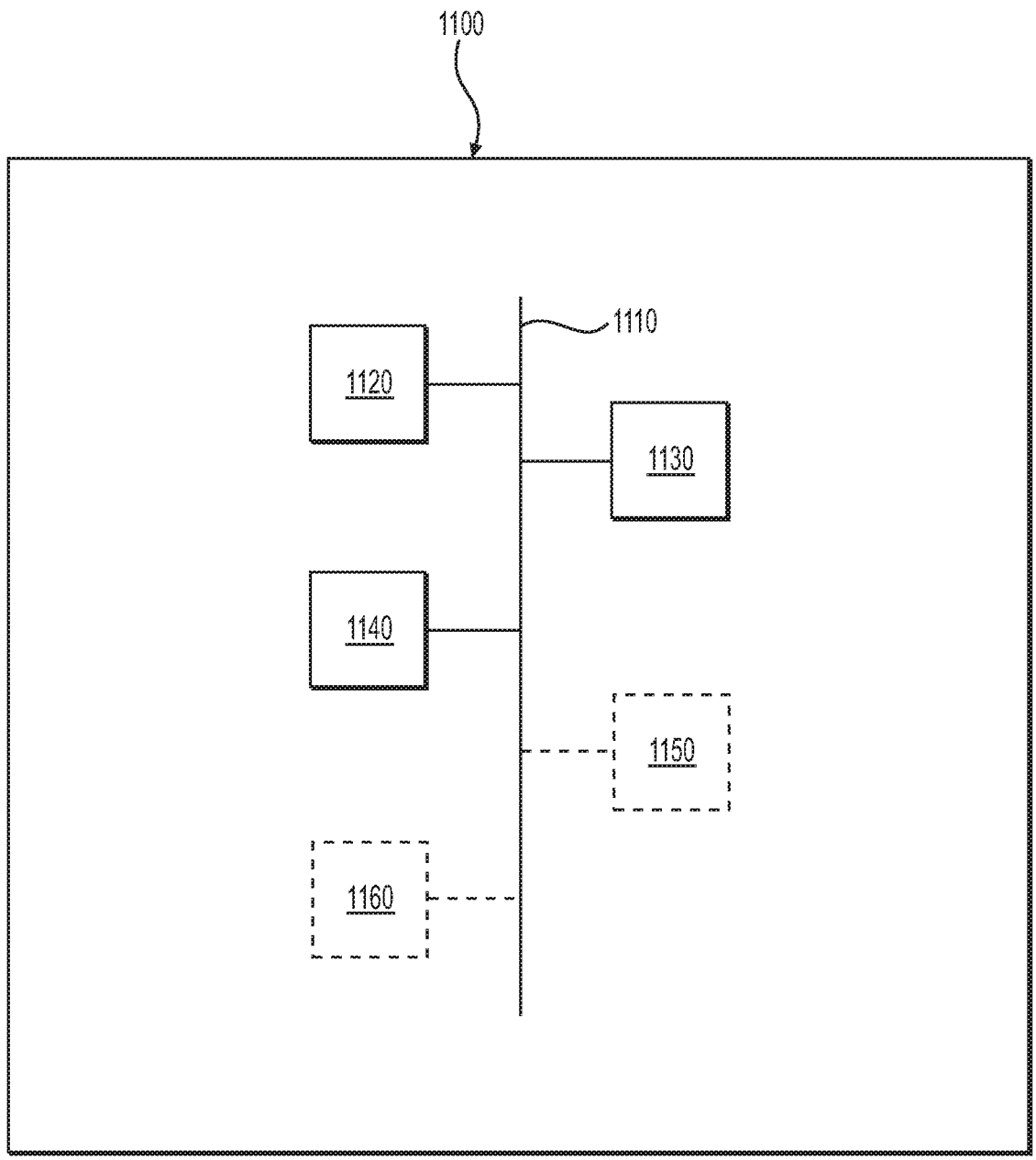
FIG. 11 is a diagram illustrating an electronic device according to some example embodiments.

FIG. 11 is a diagram illustrating an electronic device 1100 according to some example embodiments. The electronic device 1100 may implement one or more of the devices shown in FIG. 1, including one or more of the ad hoc devices 110-1 to 110-5, AHSS nodes 130-1 and 130-2, and central controller device 150.

Referring to FIG. 11, the electronic device 1100 includes a memory 1120, a processor 1130, a user interface 1140, and a communication interface 1150. The communication interface 1150 may include an ad hoc communication transceiver. As further shown, the electronic device 1100 may include an additional communication interface 1160 (e.g., a TCP/IP interface).

In some example embodiments, including example embodiments where the electronic device 1100 is an ad hoc device and/or an AHSS node, the communication interface 1150 may be an ad hoc wireless network communication transceiver. The ad hoc wireless network communication transceiver may be configured to establish ad hoc wireless network communication links with a plurality of devices. For example, the communication interface 1150 may be a BLE transceiver.

In some example embodiments, including example embodiments where the electronic device 1100 is an AHSS node and a central controller device, the additional communication interface 1160 may be a network communication interface configured to establish a network communication link with a communication network. For example, the additional communication interface 1160 may be a TCP/IP interface.

The memory 1120, the processor 1130, the user interface 1140, the communication interface 1150, and the additional communication interface 1160 may communicate with one another through a bus 1110.

The additional communication interface 1160 may communicate data from an external device using various Internet protocols.

The processor 1130 may execute a program and control the electronic device 1100. A program code to be executed by the processor 1130 may be stored in the memory 1120. An electronic system may be connected to an external device through an input/output device (not shown) and exchange data with the external device.

The memory 1120 may store information, including a program of instruction. The memory 1120 may be a volatile or a nonvolatile memory. The memory 1120 may be a non-transitory computer readable storage medium. The memory may store computer-readable instructions that, when executed, cause the execution of one or more methods, functions, processes, etc. as described herein. In some example embodiments, the processor 1130 may execute one or more of the computer-readable instructions stored at the memory 1120.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. An apparatus, comprising:
a Bluetooth Low Energy (BLE) network communication transceiver configured to establish BLE network communication links between a plurality of BLE devices;
a memory storing a program of instructions; and
a processor configured to execute the program of instructions to establish a BLE network communication link at a link layer between a BLE central device and a BLE peripheral device, wherein establishing the BLE network communication link comprises receiving an advertisement from the BLE peripheral device, setting up a link layer connection with the BLE peripheral device, advertising on behalf of the BLE peripheral device using an address of the BLE peripheral device, and setting up a link layer connection with the BLE central device in response to the advertisement, such that the apparatus is a transparent node in the BLE network communication link,
the processor further configured to implement rule-based control of at least one of the BLE central device and the BLE peripheral device at a service layer based on processing a first data packet received from the BLE central device or the BLE peripheral device via the BLE network communication link, such that the rule-based control includes performing at least one operation of selectively forwarding the first data packet, selectively inhibiting the first data packet from being forwarded, modifying the first data packet and forwarding the modified first data packet, and generating and transmitting a second data packet,
wherein implementing rule-based control of at least one of the BLE central device and the BLE peripheral device includes selectively enabling access, by the BLE central device over the BLE network communication link, to a particular service profile of the BLE peripheral device based on a determined identity associated with at least one of the BLE central device and the BLE peripheral device,
wherein the determined identity comprises a particular service profile associated with the BLE peripheral device.

2. The apparatus of claim 1, wherein,
implementing rule-based control of at least one of the BLE central device and the BLE peripheral device includes selectively enabling access, by the BLE central device over the BLE network communication link, to one or more sub-profiles of the particular service profile of the BLE peripheral device based on the determined identity.

3. The apparatus of claim 1, wherein,
the determined identity further comprises a particular service profile associated with the BLE central device.

4. The apparatus of claim 1, wherein,
the first data packet includes a request for a selected set of data from the BLE peripheral device, and
implementing the rule-based control of at least one of the BLE central device and the BLE peripheral device includes selectively forwarding the first data packet to the BLE peripheral device based on determining whether the BLE central device is associated with an authorization to receive the selected set of data.

5. The apparatus of claim 1, wherein,
the first data packet includes an instance of data, and
implementing the rule-based control of at least one of the BLE central device and the BLE peripheral device includes selectively forwarding the first data packet to the BLE central device based on processing the instance of data.

6. The apparatus of claim 5, wherein,
the instance of data is associated with a particular data type and has a particular data value, and
implementing the rule-based control of at least one of the BLE central device and the BLE peripheral device includes selectively forwarding the first data packet to the BLE central device based on determining whether the particular data value at least meets a threshold data value of the particular data type that is associated with the BLE central device.

7. The apparatus of claim 1, wherein,
the BLE network communication link comprises a first BLE network communication link,
the BLE peripheral device comprises a first BLE peripheral device,
the processor is further configured to execute the program of instructions to establish a second BLE network communication link between the BLE central device and a second BLE peripheral device, such that the apparatus is a transparent node in the second BLE network communication link, and
the processor is further configured to execute the program of instructions to implement rule-based control of the second BLE peripheral device based on generating, at the apparatus, a data packet that is transmitted to the second BLE peripheral device based on processing a data packet communicated from the BLE central device to the first BLE peripheral device via the first BLE network communication link.

8. The apparatus of claim 1, further comprising:
a network communication interface configured to establish a network communication link with an external apparatus, the external apparatus further configured to establish BLE network communication links with a separate plurality of BLE devices,
wherein establishing the BLE network communication link between the BLE central device and the BLE peripheral device includes:
  establishing, at the apparatus, an initial BLE network communication link with the BLE central device,
  communicating with the external apparatus, via the network communication link, to cause the external apparatus to establish a subsequent BLE network communication link with the BLE peripheral device, and
  establishing the BLE network communication link via the initial BLE network communication link, the network communication link, and the subsequent BLE network communication link, such that the apparatus and the external apparatus are both transparent nodes in the BLE network communication link.

9. The apparatus of claim 1, wherein,
the processor is further configured to execute the program of instructions to implement the rule-based control of at least one of the BLE central device and the BLE peripheral device based on processing a plurality of data packets received at the apparatus, at least one data packet of the plurality of data packets received from the BLE central device via the BLE network communication link.

10. A method, implemented at an apparatus configured to establish Bluetooth Low Energy (BLE) network communication links with a plurality of BLE devices, the method comprising:
  establishing a BLE network communication link at a link layer between a BLE central device and a BLE peripheral device, wherein establishing the BLE network communication link comprises receiving an advertisement from the BLE peripheral device, setting up a link layer connection with the BLE peripheral device, advertising on behalf of the BLE peripheral device using an address of the BLE peripheral device, and setting up a link layer connection with the BLE central device in response to the advertisement, such that the apparatus is a transparent node in the BLE network communication link; and
  implementing rule-based control of at least one of the BLE central device and the BLE peripheral device at a service layer based on processing a first data packet received from the BLE central device or the BLE peripheral device via the BLE network communication link, such that the rule-based control includes performing at least one operation of:
    selectively forwarding the first data packet,
    selectively inhibiting the first data packet from being forwarded,
    modifying the first data packet and forwarding the modified first data packet, and
    generating and transmitting a second data packet,
  wherein implementing rule-based control of at least one of the BLE central device and the BLE peripheral device includes selectively enabling access, by the BLE central device over the BLE network communication link, to a particular service profile of the BLE peripheral device based on a determined identity associated with at least one of the BLE central device and the BLE peripheral device,
  wherein the determined identity comprises a particular service profile associated with the BLE peripheral device.

11. The method of claim 10, wherein,
implementing rule-based control of at least one of the BLE central device and the BLE peripheral device includes selectively enabling access, by the BLE central device over the BLE network communication link, to one or more sub-profiles of the particular service profile of the BLE peripheral device based on the determined identity.

12. The method of claim 10, wherein,
the determined identity further comprises a particular service profile associated with the BLE central device.

13. The method of claim 10, wherein,
the first data packet includes a request for a selected set of data from the BLE peripheral device, and
implementing the rule-based control of at least one of the BLE central device and the BLE peripheral device includes selectively forwarding the first data packet to the BLE peripheral device based on determining whether the BLE central device is associated with an authorization to receive the selected set of data.

14. The method of claim 10, wherein,
the first data packet includes an instance of data, and
implementing the rule-based control of at least one of the BLE central device and the BLE peripheral device includes selectively forwarding the first data packet to the BLE central device based on processing the instance of data.

15. The method of claim 14, wherein,
the instance of data is associated with a particular data type and has a particular data value, and
implementing the rule-based control of at least one of the BLE central device and the BLE peripheral device includes selectively forwarding the first data packet to the BLE central device based on determining whether the particular data value at least meets a threshold data value of the particular data type that is associated with the BLE central device.

16. The method of claim 10, wherein:
the BLE network communication link comprises a first BLE network communication link, the BLE peripheral device comprises a first BLE peripheral device, the method further comprises:
  establishing a second BLE network communication link between the BLE central device and a second BLE peripheral device, such that the apparatus is a transparent node in the second BLE network communication link, and
  implementing rule-based control of the second BLE peripheral device based on generating, at the apparatus, a data packet that is transmitted to the second BLE peripheral device based on processing a data packet communicated from the BLE central device to the first BLE peripheral device via the first BLE network communication link.

17. The method of claim 10, wherein,
the establishing the BLE network communication link between the BLE central device and the BLE peripheral device includes:
  establishing, at the apparatus, an initial BLE network communication link with the BLE central device,
  communicating with an external apparatus, via a network communication link, to cause the external apparatus to establish a subsequent BLE network communication link with the BLE peripheral device, and
  establishing the BLE network communication link via the initial BLE network communication link, the network communication link, and the subsequent BLE network communication link, such that the apparatus and the external apparatus are both transparent nodes in the BLE network communication link.

18. The method of claim 10, further comprising:
implementing the rule-based control of at least one of the BLE central device and the BLE peripheral device based on processing a plurality of data packets received at the apparatus, at least one data packet of the plurality of data packets received from the BLE central device via the BLE network communication link.

19. The method of claim 10, wherein,
implementing the rule-based control of at least one of the BLE central device and the BLE peripheral device includes extending software defined networking (SDN) to BLE network communication between the BLE central device and the BLE peripheral device.

20. A non-transitory computer-readable medium embodying programmed instructions which, when executed by at least one processor of an apparatus, directs the at least one processor to:
  establish a Bluetooth Low Energy (BLE) network communication link at a link layer between a BLE central device and a BLE peripheral device, wherein establishing the BLE network communication link comprises receiving an advertisement from the BLE peripheral device, setting up a link layer connection with the BLE peripheral device, advertising on behalf of the BLE peripheral device using an address of the BLE peripheral device, and setting up a link layer connection with the BLE central device in response to the advertisement, such that the apparatus is a transparent node in the BLE network communication link; and
  implement rule-based control of at least one of the BLE central device and the BLE peripheral device at a service layer based on processing a first data packet received from the BLE central device or the BLE peripheral device via the BLE network communication link, such that the rule-based control includes performing at least one operation of selectively forwarding the first data packet, selectively inhibiting the first data packet from being forwarded, modifying the first data packet and forwarding the modified first data packet, and generating and transmitting a second data packet,
  wherein implementing rule-based control of at least one of the BLE central device and the BLE peripheral device includes selectively enabling access, by the BLE central device over the BLE network communication link, to a particular service profile of the BLE peripheral device based on a determined identity associated with at least one of the BLE central device and the BLE peripheral device,
  wherein the determined identity comprises a particular service profile associated with the BLE peripheral device.

* * * * *